US012075389B2

(12) United States Patent
Zhou et al.

(10) Patent No.: US 12,075,389 B2
(45) Date of Patent: Aug. 27, 2024

(54) CONFIGURED BANDWIDTH PART AND RESOURCE ALLOCATION SWITCHING

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 17/581,612

(22) Filed: Jan. 21, 2022

(65) Prior Publication Data

US 2023/0239841 A1    Jul. 27, 2023

(51) Int. Cl.
*H04L 5/16* (2006.01)
*H04L 27/26* (2006.01)
*H04W 72/04* (2023.01)
*H04W 72/044* (2023.01)

(52) U.S. Cl.
CPC ............. *H04W 72/044* (2013.01); *H04L 5/16* (2013.01); *H04L 27/2607* (2013.01)

(58) Field of Classification Search
None
See application file for complete search history.

(56) References Cited

U.S. PATENT DOCUMENTS

| 2021/0203469 | A1 | 7/2021 | Abedini et al. |
| 2021/0320780 | A1 | 10/2021 | Manolakos et al. |
| 2021/0329646 | A1* | 10/2021 | Fakoorian ............. H04W 72/53 |
| 2021/0360618 | A1* | 11/2021 | Novlan ............... H04W 56/001 |
| 2021/0400637 | A1 | 12/2021 | Abotabl et al. |
| 2022/0014345 | A1 | 1/2022 | Abdelghaffar et al. |

OTHER PUBLICATIONS

International Search Report and Written Opinion—PCT/US2022/053741—ISA/EPO—Mar. 24, 2023.

* cited by examiner

*Primary Examiner* — Hong Shao
(74) *Attorney, Agent, or Firm* — Holland & Hart LLP/Qualcomm Incorporated

(57) ABSTRACT

Methods, systems, and devices for wireless communications are described. A base station may indicate via control signaling a switching pattern for a bandwidth part (BWP) for communication between a user equipment (UE) and the base station. The switching pattern may include a set of slots associated with a full-duplex communications mode and a set of slots associated with a half-duplex communications mode. The UE and the base station may communicate in the half-duplex communications mode using the BWP, and the UE and the base station may communicate in the full-duplex communications mode using at least one of a first sub-BWP of the BWP for uplink signaling and a second sub-BWP of the BWP for downlink signaling. The base station may configure different resource allocations, operating parameters, and physical uplink control channel resources for the same configured transmissions or receptions for the half-duplex communications mode and the full-duplex communications mode.

30 Claims, 17 Drawing Sheets

CONFIGURED BANDWIDTH PART AND RESOURCE ALLOCATION SWITCHING

FIELD OF TECHNOLOGY

The following relates to wireless communications, including configured bandwidth part and resource allocation switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support configured bandwidth part (BWP) and resource allocation switching. Generally, the described techniques provide for configured periodic BWP switching patterns between a half-duplex communications mode and a full-duplex communications mode as well as resource allocations and operating parameters associated with the half-duplex communications mode and the full-duplex communications mode. A base station may indicate via control signaling (e.g., a downlink control information (DCI) message, a radio resource control (RRC) message, or a medium access control (MAC) control element (MAC-CE) message) a periodic switching pattern for a BWP for communication between a user equipment (UE) and the base station. The switching pattern may include a set of slots associated with the full-duplex communications mode and a set of slots associated with the half-duplex communications mode. The UE and the base station may communicate in the half-duplex communications mode using the BWP, and the UE and the base station may communicate in the full-duplex communications mode using at least one of a first sub-BWP of the BWP for uplink signaling and a second sub-BWP of the BWP for downlink signaling. The base station may configure different resource allocations, operating parameters, or physical uplink control channel resources for the same configured transmissions or receptions for the half-duplex communications mode and the full-duplex communications mode. For example, for the same semi-persistent scheduling (SPS) configuration occasion, the base station may indicate a different set of resource allocations and/or operating parameters for the half-duplex communications mode and the full-duplex communications mode.

A method for wireless communications at a UE is described. The method may include receiving, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode, communicating with the base station during the first set of slots using the BWP, and communicating with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

An apparatus for wireless communications is described. The apparatus may include a memory, a transceiver, and at least one processor of a UE, the at least one processor coupled with the memory and the transceiver. The at least one processor may be configured to cause the apparatus to receive, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode, communicate with the base station during the first set of slots using the BWP, and communicate with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

Another apparatus for wireless communications at a UE is described. The apparatus may include means for receiving, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode, means for communicating with the base station during the first set of slots using the BWP, and means for communicating with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

A non-transitory computer-readable medium storing code for wireless communications at a UE is described. The code may include instructions executable by a processor to receive, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode, communicate with the base station during the first set of slots using the BWP, and communicate with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

Some examples of the method, apparatuses, and non-transitory computer-readable medium described herein may further include operations, features, means, or instructions for receiving, with the control signaling, an indication of a first set of parameters associated with the half-duplex communications mode and a second set of parameters associated with the full-duplex communications mode.

In some examples of the method, apparatuses, and non-transitory computer-readable medium described herein, the first set of parameters and the second set of parameters include a beam identifier, a power control parameter, a transmission power, a rank index, a channel quality indicator, a modulation and coding scheme, or a combination thereof.

Some examples of the method, apparatuses, and non-transitory computer-readable medium described herein may further include operations, features, means, or instructions for receiving, with the control signaling, an indication of the first set of resources and the second set of resources.

Some examples of the method, apparatuses, and non-transitory computer-readable medium described herein may further include operations, features, means, or instructions for receiving, with the control signaling, a second indication of a guard band in the frequency domain between the first set of resources and the second set of resources.

Some examples of the method, apparatuses, and non-transitory computer-readable medium described herein may further include operations, features, means, or instructions for receiving, with the control signaling, an indication of a guard period between the first set of slots associated with the half-duplex communications mode and the second set of slots associated with the full-duplex communications mode.

Some examples of the method, apparatuses, and non-transitory computer-readable medium described herein may further include operations, features, means, or instructions for receiving, with the control signaling, an indication that at least one slot of the first set of slots associated with the half-duplex communications mode may be reserved for control communications with the base station.

In some examples of the method, apparatuses, and non-transitory computer-readable medium described herein, the control communications includes a synchronization signal block.

Some examples of the method, apparatuses, and non-transitory computer-readable medium described herein may further include operations, features, means, or instructions for receiving, with the control signaling, a first indication of a first set of resource allocations, physical uplink control channel resources, or first operation parameters for a configured transmission or configured reception occurring in the first set of slots associated with the half-duplex communications mode, and a second indication of a second set of resource allocations, physical uplink control channel resources, or second operation parameters for the configured transmission or configured reception occurring in the second set of slots associated with the full-duplex communications mode.

In some examples of the method, apparatuses, and non-transitory computer-readable medium described herein, the configured transmission or configured reception includes an SPS configuration occasion, a configured grant, a reference signal, a random access channel occasion, or a search space.

In some examples of the method, apparatuses, and non-transitory computer-readable medium described herein, the first operation parameters and the second operation parameters include a demodulation reference signal format, a modulation and coding scheme, a rank index, a precoding matrix indicator, or a combination thereof.

In some examples of the method, apparatuses, and non-transitory computer-readable medium described herein, receiving the control signaling may include operations, features, means, or instructions for receiving the control signaling via a downlink control information message, a radio resource control message, or a MAC-CE message.

In some examples of the method, apparatuses, and non-transitory computer-readable medium described herein, communicating with the base station during the second set of slots may include operations, features, means, or instructions for communicating with the base station in the full-duplex communications mode using the first sub-BWP for receiving downlink signaling and the second sub-BWP for transmitting uplink signaling.

A method for wireless communications at a base station is described. The method may include transmitting, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode, communicating with the UE during the first set of slots using the BWP, and communicating with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

An apparatus for wireless communication is described. The apparatus may include a memory, a transceiver, and at least one processor of a base station, the at least one processor coupled with the memory and the transceiver. The at least one processor may be configured to cause the apparatus to transmit, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode, communicate with the UE during the first set of slots using the BWP, and communicate with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

Another apparatus for wireless communications at a base station is described. The apparatus may include means for transmitting, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode, means for communicating with the UE during the first set of slots using the BWP, and means for communicating with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

A non-transitory computer-readable medium storing code for wireless communications at a base station is described. The code may include instructions executable by a processor to transmit, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode, communicate with the UE during the first set of slots using the BWP, and communicate with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

Some examples of the method, apparatuses, and non-transitory computer-readable medium described herein may further include operations, features, means, or instructions for transmitting, to a second UE, second control signaling indicating the periodic switching pattern for the BWP for communications between the base station and the second UE.

Some examples of the method, apparatuses, and non-transitory computer-readable medium described herein may further include operations, features, means, or instructions for transmitting, to a second UE, second control signaling indicating a second periodic switching pattern for the BWP for communications between the base station and the second UE, the second periodic switching pattern including a third set of slots associated with the half-duplex communications mode and a fourth set of slots associated with the full-duplex communications mode, the third set of slots different from the first set of slots and the fourth set of slots different from the second set of slots, communicating with the second UE during the third set of slots using the BWP, and communicating with the second UE during the fourth set of slots using at least one of a third sub-BWP configured for downlink signaling for the fourth set of slots and a fourth sub-BWP configured for uplink signaling for the fourth set of slots, where the third sub-BWP includes a third set of resources spanning at least a third portion of the BWP in the frequency domain and the fourth sub-BWP includes a fourth set of resources spanning at least a fourth portion of the BWP in the frequency domain, the third portion different from the fourth portion.

Some examples of the method, apparatuses, and non-transitory computer-readable medium described herein may further include operations, features, means, or instructions for transmitting, to a second UE, second control signaling indicating a second periodic switching pattern for a second BWP of the carrier bandwidth for communications between the base station and the second UE, the second periodic switching pattern including a third set of slots associated with the half-duplex communications mode and a fourth set of slots associated with the full-duplex communications mode, the second BWP different from the BWP, communicating with the second UE during the third set of slots using the second BWP, and communicating with the second UE during the fourth set of slots using at least one of a third sub-BWP configured for downlink signaling for the fourth set of slots and a fourth sub-BWP configured for uplink signaling for the fourth set of slots, where the third sub-BWP includes a third set of resources spanning at least a third portion of the second BWP in the frequency domain and the fourth sub-BWP includes a fourth set of resources spanning at least a fourth portion of the second BWP in the frequency domain, the third portion different from the fourth portion.

Some examples of the method, apparatuses, and non-transitory computer-readable medium described herein may further include operations, features, means, or instructions for transmitting, with the control signaling, an indication of a first set of parameters associated with the half-duplex communications mode and a second set of parameters associated with the full-duplex communications mode.

In some examples of the method, apparatuses, and non-transitory computer-readable medium described herein, the first set of parameters and the second set of parameters include a beam identifier, a power control parameter, a transmission power, a rank index, a channel quality indicator, a modulation and coding scheme, or a combination thereof.

Some examples of the method, apparatuses, and non-transitory computer-readable medium described herein may further include operations, features, means, or instructions for transmitting, with the control signaling, an indication of the first set of resources and the second set of resources.

Some examples of the method, apparatuses, and non-transitory computer-readable medium described herein may further include operations, features, means, or instructions for transmitting, with the control signaling, a second indication of a guard band in the frequency domain between the first set of resources and the second set of resources.

Some examples of the method, apparatuses, and non-transitory computer-readable medium described herein may further include operations, features, means, or instructions for transmitting, with the control signaling, an indication of a guard period between the first set of slots associated with the half-duplex communications mode and the second set of slots associated with the full-duplex communications mode.

Some examples of the method, apparatuses, and non-transitory computer-readable medium described herein may further include operations, features, means, or instructions for transmitting, with the control signaling, an indication that at least one slot of the first set of slots associated with the half-duplex communications mode may be reserved for control communications with the base station.

In some examples of the method, apparatuses, and non-transitory computer-readable medium described herein, the control communications includes a synchronization signal block.

Some examples of the method, apparatuses, and non-transitory computer-readable medium described herein may further include operations, features, means, or instructions for transmitting, with the control signaling, a first indication of a first set of resource allocations, a physical uplink control channel resources, or first operation parameters for a configured transmission or configured reception occurring in the first set of slots associated with the half-duplex communications mode, and a second indication of a second set of resource allocations, physical uplink control channel resources, or second operation parameters for the configured transmission or configured reception occurring in the second set of slots associated with the full-duplex communications mode.

In some examples of the method, apparatuses, and non-transitory computer-readable medium described herein, the configured transmission or configured reception includes an SPS configuration occasion, a configured grant, a reference signal, a random access channel occasion, or a search space.

In some examples of the method, apparatuses, and non-transitory computer-readable medium described herein, the first operation parameters and the second operation parameters include a demodulation reference signal format, a modulation and coding scheme, a rank index, a precoding matrix indicator, or a combination thereof.

In some examples of the method, apparatuses, and non-transitory computer-readable medium described herein, transmitting the control signaling may include operations, features, means, or instructions for transmitting the control signaling via a downlink control information message, a radio resource control message, or a MAC-CE message.

In some examples of the method, apparatuses, and non-transitory computer-readable medium described herein, communicating with the UE during the second set of slots may include operations, features, means, or instructions for communicating with the UE in the full-duplex communications mode using the first sub-BWP for transmitting downlink signaling and the second sub-BWP for receiving uplink signaling.

DETAILED DESCRIPTION

Figure 1:
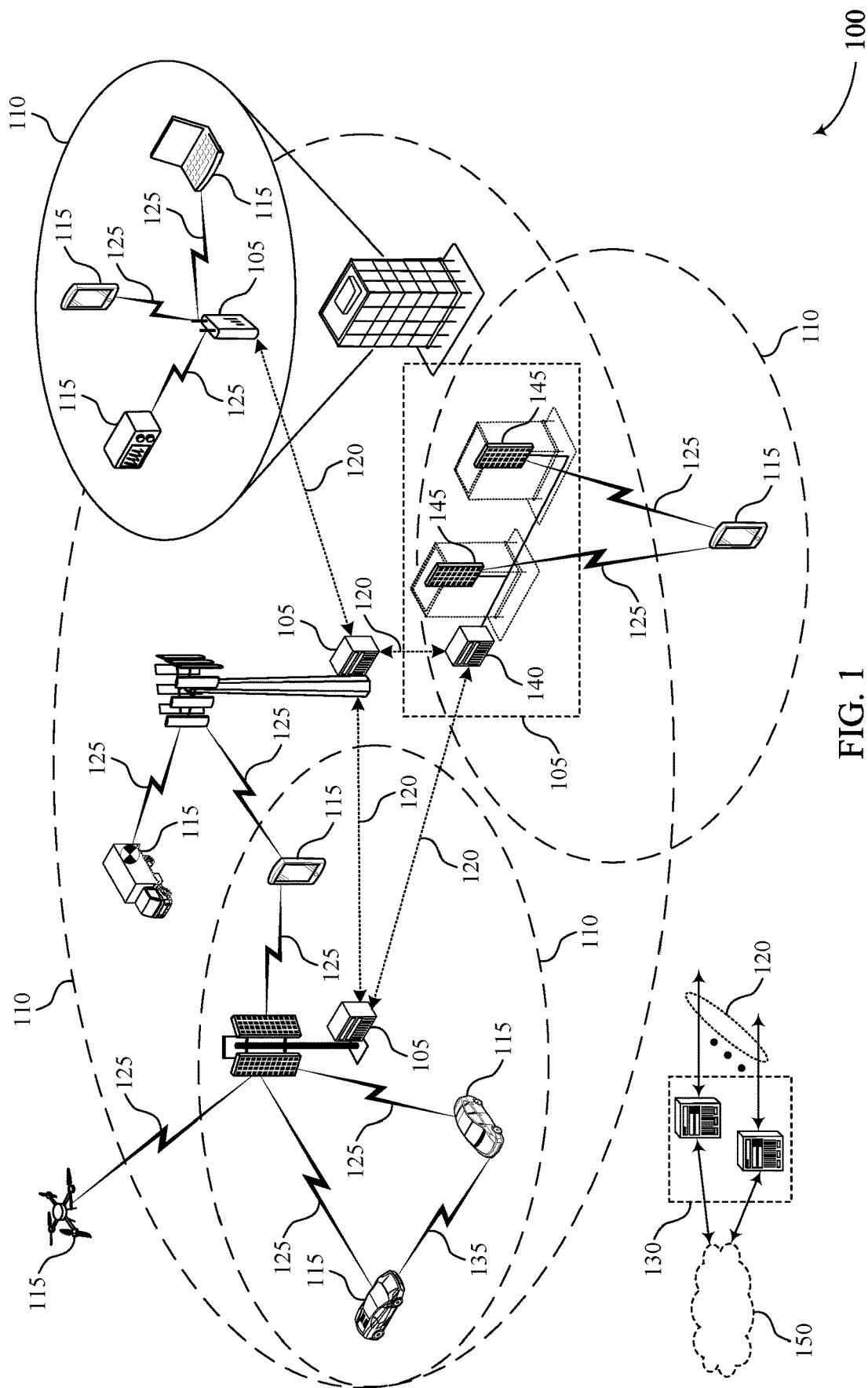
FIG. 1 illustrates an example of a wireless communications system that supports configured bandwidth part (BWP) and resource allocation switching in accordance with aspects of the present disclosure.

In some wireless communications systems, a user equipment (UE) may communicate with a base station over time frequency resources, such as one or more bandwidth parts (BWPs) or a carrier bandwidth. Some wireless communications devices (e.g., user equipments (UEs) or base stations) may be configured to perform both half-duplex and full-duplex wireless communications. In a slot that is configured for full-duplex communications, a base station may be configured to transmit downlink data to one or more UEs while concurrently receiving uplink data from one or more UEs. Similarly, in a slot that is configured for full-duplex communications, a UE may be configured to receive downlink data from a base station while concurrently transmitting uplink data to the base station. In a slot that is configured for half-duplex communications, a base station or a UE may transmit or receive communications in one direction (either uplink or downlink).

Full-duplex communications may be associated with less latency, more efficient resource utilization, and coverage enhancement as compared to half-duplex communications. Half-duplex communications may be desirable for some communications, such as control communications (e.g., the reception of a synchronization signal block (SSB)). There is currently no set configuration for switching between half-duplex communications and full-duplex communications for a given BWP. Additionally, some resource allocations, physical uplink control channel (PUCCH) resources, and operating parameters may be associated with better performance in a half-duplex or a full-duplex mode.

The present disclosure relates to configured BWP switching patterns between a half-duplex communications mode and a full-duplex communications mode as well as resource allocations and operating parameters associated with the half-duplex communications mode and the full-duplex communications mode. In some examples, the BWP switching patterns may be periodic. The base station may indicate via control signaling (e.g., a downlink control information (DCI) message, a radio resource control (RRC) message, or a medium access control (MAC) control element (MAC-CE) message) a switching pattern for a BWP for communication between the UE and the base station. In some examples, the switching pattern for the BWP may be periodic. The switching pattern may include a set of slots associated with the full-duplex communications mode and a set of slots associated with the half-duplex communications mode. The UE and the base station may communicate in the half-duplex communications mode using the BWP, and the UE and the base station may communicate in the full-duplex communications mode using at least one of a first sub-BWP of the BWP for uplink signaling and a second sub-BWP of the BWP for downlink signaling. The base station may configure different resource allocations, operating parameters, and PUCCH resources for the same configured transmissions or receptions for the half-duplex communications mode and the full-duplex communications mode. For example, for the same semi-persistent scheduling (SPS) configuration occasion, the base station may indicate a different set of resource allocations and/or operating parameters for the half-duplex communications mode and the full-duplex communications mode.

In some examples, a base station may communicate with more than one UE using a same BWP switching pattern. In some examples, a base station may communicate with multiple UEs using different BWP switching patterns with the different UEs. For example, the base station may configure a first switching pattern including a first set of slots associated with the full-duplex communications mode and a second set of slots associated with the half-duplex communications mode for the BWP for a first UE and a second switching pattern including a third set of slots associated with the full-duplex communications mode and a fourth set of slots associated with the half-duplex communications mode for the BWP for communications with a second UE, where the third set of slots are different from the first set of slots and the fourth set of slots are different from the second set of slots. In some examples, a base station may communicate with more than one UE using different BWPs, where the base station may configure a different switching pattern for each BWP for each UE. For example, the base station may configure a first switching pattern including a first set of slots associated with the full-duplex communications mode and a second set of slots associated with the half-duplex communications mode for a first BWP for communications with a first UE and a second switching pattern including a third set of slots associated with the full-duplex communications mode and a fourth set of slots associated with the half-duplex communications mode for a second BWP for communications with a second UE. In some examples, the third set of slots may be different from the first set of slots and the fourth set of slots may be different from the second set of slots. In some examples, the third set of slots may be the same as the first set of slots and the fourth set of slots may be the same as the second set of slots.

Aspects of the disclosure are initially described in the context of wireless communications systems. Aspects of the disclosure are further illustrated by and described with reference to resource diagrams and process flows. Aspects of the disclosure are further illustrated by and described with reference to apparatus diagrams, system diagrams, and flowcharts that relate to configured BWP and resource allocation switching.

FIG. 1 illustrates an example of a wireless communications system 100 that supports configured BWP and resource allocation switching in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may indicate via control signaling (e.g., DCI, RRC, or MAC-CE) a switching pattern for a BWP of a carrier bandwidth for communication between a UE 115 and the base station 105. The switching pattern may include a set of slots associated with the full-duplex communications mode and a set of slots associated with the half-duplex communications mode. In some examples, the switching pattern may be periodic. The UE 115 and the base station 105 may communicate in the half-duplex communications mode using the BWP, and the UE 115 and the base station 105 may communicate in the full-duplex communications mode using at least one of a first sub-BWP of the BWP for uplink signaling and a second sub-BWP of the BWP for downlink signaling. The base station 105 may configure different resource allocations, operating parameters, and PUCCH resources for the same configured transmissions or receptions for the half-duplex communications mode and the full-duplex communications mode. For example, for the same SPS configuration occasion, the base station 105 may indicate a different set of resource allocations and/or operating parameters for the half-duplex communications mode and the full-duplex communications mode.

In some examples, a base station 105 may communicate with more than one UE 115 using a same BWP switching pattern. In some examples, a base station 105 may communicate with multiple UEs 115 using different BWP switching patterns with the different UEs 115 for the same BWP. For example, the base station 105 may configure a first switching pattern including a first set of slots associated with the full-duplex communications mode and a second set of slots associated with the half-duplex communications mode for the BWP for a first UE 115 and a second switching pattern including a third set of slots associated with the full-duplex communications mode and a fourth set of slots associated with the half-duplex communications mode for the BWP for communications with a second UE 115, where the third set of slots are different from the first set of slots and the fourth set of slots are different from the second set of slots. In some examples, a base station 105 may communicate with more than one UE 115 using different BWPs of a carrier bandwidth, where the base station 105 may configure a different switching pattern for each BWP for each UE 115. For example, the base station 105 may configure a first switching pattern including a first set of slots associated with the full-duplex communications mode and a second set of slots associated with the half-duplex communications mode for a first BWP for communications with a first UE 115 and a second switching pattern including a third set of slots associated with the full-duplex communications mode and a fourth set of slots associated with the half-duplex communications mode for a second BWP for communications with a second UE 115. In some examples, the third set of slots may be different from the first set of slots and the fourth set of slots may be different from the second set of slots. In some examples, the third set of slots may be the same as the first set of slots and the fourth set of slots may be the same as the second set of slots.

Figure 2:
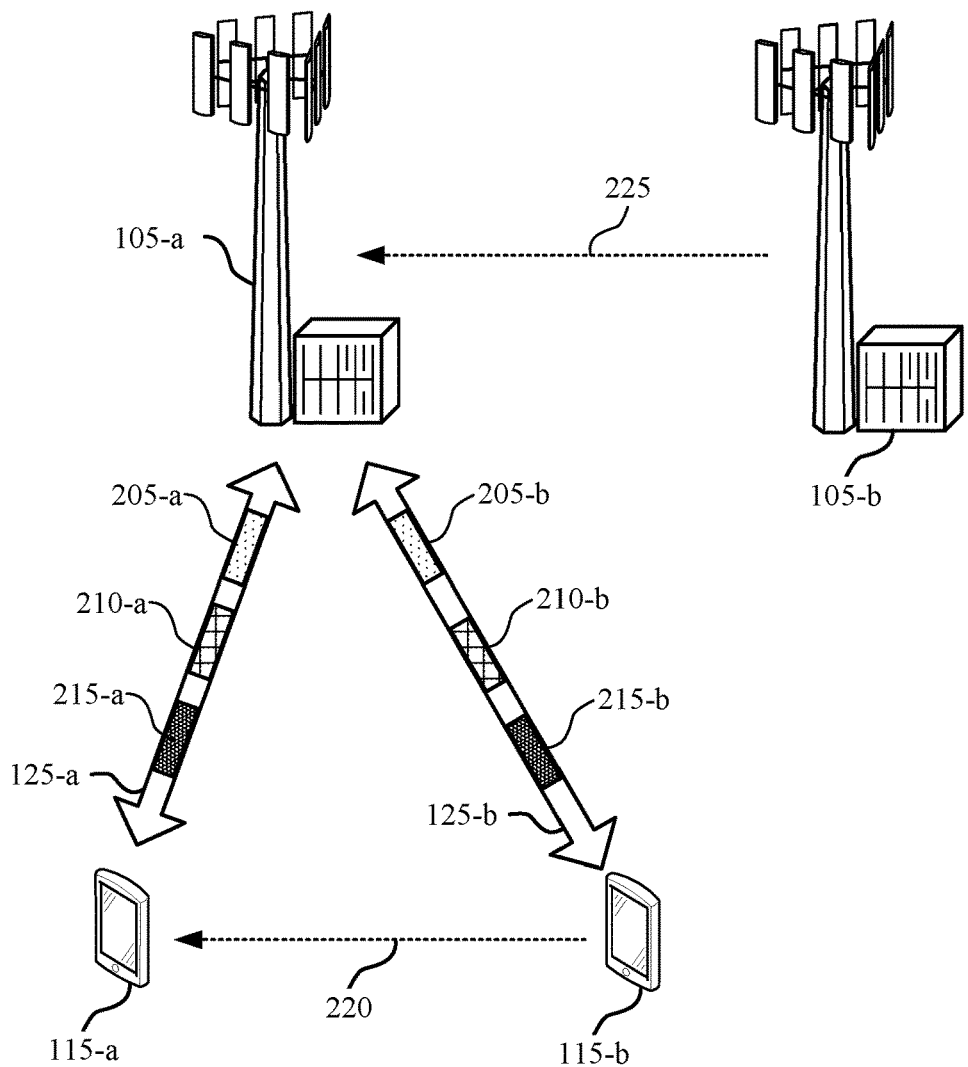
FIG. 2 illustrates an example of a wireless communications system that supports configured BWP and resource allocation switching in accordance with aspects of the present disclosure.
Figure 2:
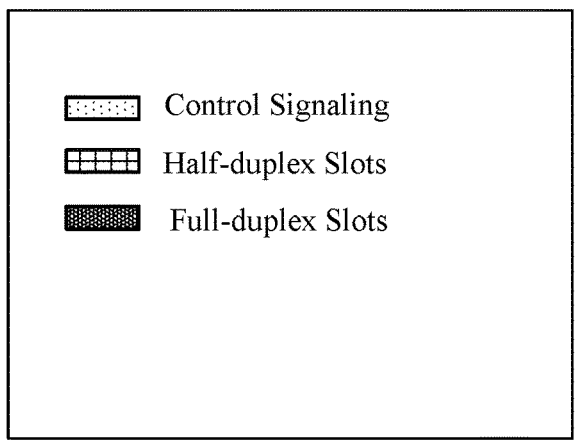

FIG. 2 illustrates an example of a wireless communications system 200 that supports configured BWP and resource allocation switching in accordance with aspects of the present disclosure. In some examples, the wireless communications system 200 may implement aspects of wireless communications system 100. The wireless communications system 200 may include UEs 115-a and 115-b, which may be examples of UEs 115 as described herein. The wireless communications system 200 may include base stations 105-a and 105-b, which may be examples of base stations 105 as described herein.

The first UE 115-a and the second UE 115-b may communicate with the base station 105-a using a communication link 125-a and a communication link 125-b, respectively, which may be examples of NR or LTE links between the first UE 115-*a* and the second UE 115-*b*, respectively, and the base station 105-*a*. In some cases, the communication link 125-*a* and the communication link 125-*b* may include examples of access links (e.g., Uu links). The communication link 125-*a* and communication link 125-*b* may include bi-directional links that enable both uplink and downlink communication. For example, the first UE 115-*a* may transmit uplink signals, such as uplink control signals or uplink data signals, to the base station 105-*a* using the first communication link 125-*a* and the base station 105-*a* may transmit downlink signals, such as downlink control signals or downlink data signals, to the first UE 115-*a* using the communication link 125-*a*. By way of another example, the second UE 115-*b* may transmit uplink signals, such as uplink control signals or uplink data signals, to the base station 105-*a* using the first communication link 125-*b* and the base station 105-*a* may transmit downlink signals, such as downlink control signals or downlink data signals, to the second UE 115-*b* using the communication link 125-*b*.

The base station 105-*a* and the UEs 115-*a* and 115-*b* may support communications over a particular carrier bandwidth, and the communications links 125-*a* and 125-*b* may be associated with portions of the carrier bandwidth (e.g., a BWP). The base station 105-*a* and the UEs 115-*a* and 115-*b* may support full-duplex communications and half-duplex communications. For example, the base station 105-*a* and the UEs 115-*a* and 115-*b* may be configured with multiple antenna panels. In a slot that is configured for full-duplex communications, the base station 105-*a* may be configured to transmit downlink data to one or both of the UEs 115-*a* and 115-*b* via the communications links 125-*a* and 125-*b*, respectively, while concurrently receiving uplink data from one or both of the UEs 115-*a* and 115-*b* via the communications links 125-*a* and 125-*b*, respectively. For example, the base station 105-*a* may transmit downlink signals using one antenna panel while receiving uplink signals using another antenna panel. In a slot that is configured for full-duplex communications, a UE 115-*a* or 115-*b* may be configured to receive downlink data from the base station 105-*a* via the communications links 125-*a* or 125-*b*, respectively, while concurrently transmitting uplink data to the base station 105-*a* via the communications links 125-*a* and 125-*b*, respectively. For example, the UEs 115-*a* or 115-*b* may receive downlink signals using one antenna panel while transmitting uplink signals using another antenna panel. In a slot that is configured for half-duplex communications, the base station 105-*a* or the UEs 115-*a* and 115-*b* may transmit or receive communications in one direction (either uplink or downlink) at a time via the communications links 125-*a* or 125-*b*.

The first UE 115-*a* may experience cross-link interference (CLI) 220 when receiving downlink signals from the base station 105-*a* via the communications link 125-*a* from uplink signals transmitted by the second UE 115-*b* via the communications link 125-*b* if the uplink signals and downlink signals overlap (e.g., if the uplink and downlink signals have overlapping symbols). Similarly the base station 105-*a* may experience CLI 225 when receiving uplink signals from one of the UEs 115-*a* or 115-*b* from downlink signals transmitted by another base station 105-*b* if the uplink signals and downlink signals overlap (e.g., if the uplink and downlink signals have overlapping symbols).

Full-duplex communications may be associated with less latency, spectrum efficiency enhancement (e.g., per cell associated with a base station 105-*a* or per UE 115-*a* or 115-*b*), more efficient resource utilization, and coverage enhancement as compared to half-duplex communications. During slots that are configured for full-duplex communications, the base station 105-*a* or the UEs 115-*a* and 115-*b* may experience self-interference between downlink and uplink signals. Accordingly, the ability for the base station 105-*a* or the UEs 115-*a* or 115-*b* to support full-duplex communications may depend on the self-interference between the downlink and uplink signals at the respective device (the base station 105-*a* or the UEs 115-*a* or 115-*b*). Additionally or alternatively, the ability for the base station 105-*a* or the UEs 115-*a* or 115-*b* to support full-duplex communications may depend on factors such as beam separation, CLI, or clutter echo.

Half-duplex communications may be desirable for some communications, such as control communications (e.g., the reception of an SSB). There is currently no set configuration for switching between half-duplex communications and full-duplex communications for a given BWP. Additionally, some resource allocations, PUCCH resources, and operating parameters may be associated with better performance in a half-duplex or a full-duplex mode.

The base station 105-*a* may configure and indicate one or more switching patterns for the BWPs for communications with one or both of the UEs 115-*a* and 115-*b* over the communications links 125-*a* and 125-*b*. For example, the base station 105-*a* may transmit control signaling 205-*a* (e.g., via DCI, RRC, or MAC-CE) indicating a switching pattern for the BWP used for communication between the UE 115-*a* and the base station 105-*a*. The switching pattern may include a set of slots 210-*a* associated with the half-duplex communications mode and a set of slots 215-*a* associated with the full-duplex communications mode. The UE 115-*a* and the base station 105-*a* may communicate during the slots 210-*a* associated with the half-duplex communications mode using the BWP, and the UE 115-*a* and the base station 105-*a* may communicate during the slots 215-*a* associated with the full-duplex communications mode using at least one of a first sub-BWP of the BWP for uplink signaling and a second sub-BWP of the BWP for downlink signaling. The first sub-BWP may include a first set of resources spanning at least a first portion of the BWP in the frequency domain, and the second sub-BWP may include a second set of resources spanning at least a second portion of the BWP in the frequency domain, where the first portion of the BWP is different from the second portion of the BWP. In some examples, the control signaling 205-*a* may indicate the first set of resources and the second set of resources associated with the first sub-BWP and the second sub-BWP.

In some examples, the base station 105-*a* may configure, and indicate via control signaling 205-*a*, different resource allocations, operating parameters, and PUCCH resources for the same configured transmissions or receptions for the half-duplex communications mode and the full-duplex communications mode. For example, for the same SPS configuration occasion, the base station 105-*a* may indicate via the control signaling 205-*a* a different set of resource allocations and/or operating parameters for the half-duplex communications mode and the full-duplex communications mode. In some examples, the base station 105-*a* may indicate, via the control signaling 205-*a*, that at least one slot of the set of slots associated with the half-duplex communications mode is reserved for control communications with the base station 105-*a* (e.g., an SSB).

In some examples, the base station 105-*a* may communicate with the second UE 115-*b* using the same BWP that the base station 105-*a* uses for communications with the first UE 115-*a*. In some examples, the base station 105-*a* may indicate, via control signaling 205-*b*, the same switching pattern for the BWP for the second UE 115-*b*. In some examples, the base station 105-*a* may configure and indicate, via the control signaling 205-*b*, a different switching pattern for the BWP used for communication between the second UE 115-*b* and the base station 105-*a* (e.g., where the BWP is the same as the BWP used for communications between the base station 105-*a* and the first UE 115-*a*). The switching pattern may include a set of slots 210-*b* associated with the half-duplex communications mode and a set of slots 215-*b* associated with the full-duplex communications mode. The set of slots 210-*b* may be different from the set of slots 210-*a*, and the set of slots 215-*b* may be different from the set of slots 215-*a*. The second UE 115-*b* and the base station 105-*a* may communicate during the slots 210-*b* associated with the half-duplex communications mode using the BWP, and the UE 115-*b* and the base station 105-*a* may communicate during the slots 215-*b* associated with the full-duplex communications mode using at least one of a third sub-BWP of the BWP for uplink signaling and a fourth sub-BWP of the BWP for downlink signaling. The third sub-BWP may include a third set of resources spanning at least a third portion of the BWP in the frequency domain, and the fourth sub-BWP may include a fourth set of resources spanning at least a fourth portion of the BWP in the frequency domain, where the third portion of the BWP is different from the fourth portion of the BWP. In some examples, the third portion of the BWP may be different from the first portion of the BWP and the fourth portion of the BWP may be different from the second portion of the BWP. In some examples, the control signaling 205-*b* may indicate the third set of resources and the fourth set of resources associated with the third sub-BWP and the fourth sub-BWP.

In some examples, the base station 105-*a* may communicate with the second UE 115-*b* using a second, different, BWP than the first BWP the base station 105-*a* uses for communications with the first UE 115-*a*. For example, the base station 105-*a* may communicate with the first UE 115-*a* via the communications link 125-*a* using a first BWP of the carrier bandwidth, and the base station 105-*a* may communicate with the second UE 115-*b* via the communications link 125-*b* using a second, different, BWP of the carrier bandwidth. In some examples, the base station 105-*a* may configure and indicate, via the control signaling 205-*b*, a switching pattern for the second BWP used for communication between the second UE 115-*b* and the base station 105-*a* (e.g., where the second BWP is different from the BWP used for communications between the base station 105-*a* and the first UE 115-*a*). The switching pattern may include a set of slots 210-*b* associated with the half-duplex communications mode and a set of slots 215-*b* associated with the full-duplex communications mode. The second UE 115-*b* and the base station 105-*a* may communicate during the slots 210-*b* associated with the half-duplex communications mode using the second BWP, and the UE 115-*b* and the base station 105-*a* may communicate during the slots 215-*b* associated with the full-duplex communications mode using at least one of a first sub-BWP of the second BWP for uplink signaling and a second sub-BWP of the second BWP for downlink signaling. The first sub-BWP may include a first set of resources spanning at least a first portion of the second BWP in the frequency domain, and the second sub-BWP may include a second set of resources spanning at least a second portion of the second BWP in the frequency domain, where the first portion of the second BWP is different from the second portion of the second BWP. In some examples, the control signaling 205-*b* may indicate the first set of resources and the second set of resources associated with the first sub-BWP of the second BWP and the second sub-BWP of the second BWP.

Figure 3:
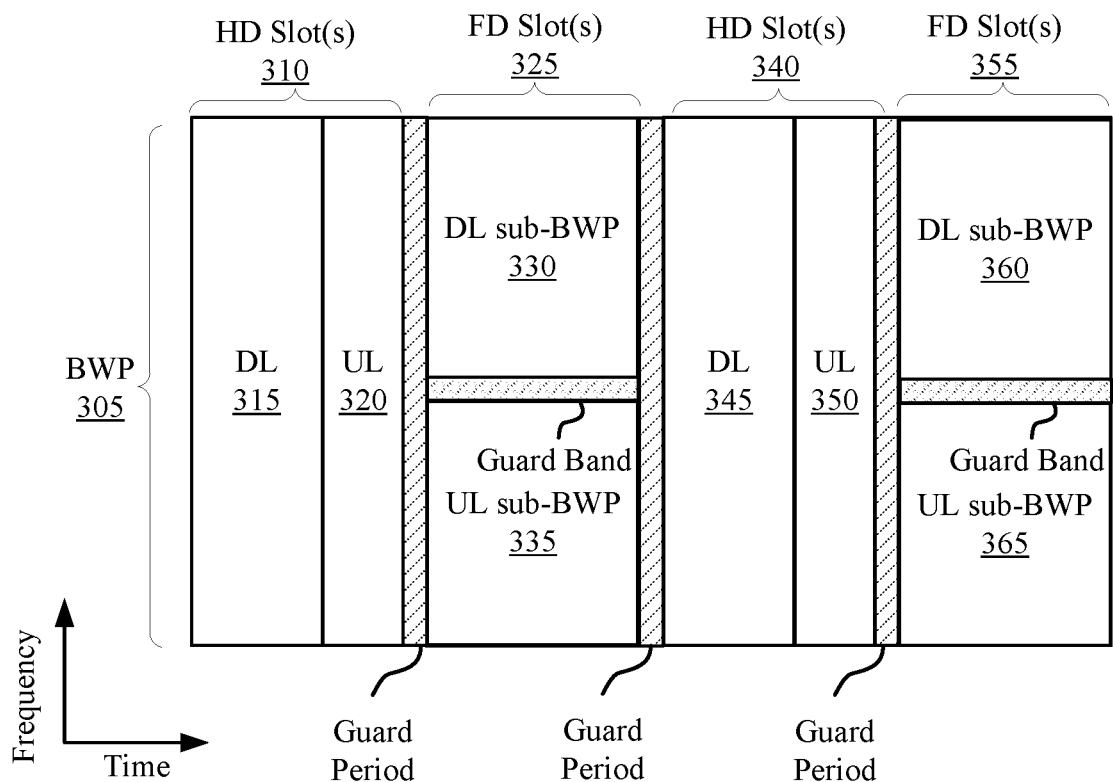
FIG. 3 illustrates an example of a BWP switching pattern that supports configured BWP and resource allocation switching in accordance with aspects of the present disclosure.

FIG. 3 illustrates an example of a BWP switching pattern 300 that supports configured BWP and resource allocation switching in accordance with aspects of the present disclosure. The BWP switching pattern 300 may implement aspects of wireless communications systems 100 or 200. For example, the BWP switching pattern 300 may illustrate an example BWP switching pattern that may be configured and used for communications between a base station 105 and one or more UEs 115 as described herein.

The BWP switching pattern 300 may be used for a BWP 305 (e.g., a portion of a carrier bandwidth) that may be used for communications between a base station 105 and one or more UEs 115. The switching pattern 300 may include a first set of slots 310 associated with a half-duplex communications mode, a second set of slots 325 associated with a full-duplex communications mode, a third set of slots 340 associated with the half-duplex communications mode, and a fourth set of slots 355 associated with the full-duplex communications mode. The switching pattern 300 may be periodic. In some examples, guard periods (e.g., one or more guard symbols) may separate the first set of slots 310 associated with the half-duplex communications mode from the second set of slots 325 associated with the full-duplex communications mode, the second set of slots 325 associated with the full-duplex communications mode from the third set of slots 340 associated with the half-duplex communications mode, and the third set of slots 340 associated with the half-duplex communications mode from the fourth set of slots 355 associated with the full-duplex communications mode.

The first set of slots 310 associated with the half-duplex communications mode may include downlink resources 315 and uplink resources 320. For example, the downlink resources 315 may include a number of downlink slots or symbols and the uplink resources 320 may include a number of uplink slots or symbols. The downlink resources 315 and the uplink resources 320 may span the entire BWP 305 in the frequency domain. The third set of slots 340 associated with the half-duplex communications mode may similarly include downlink resources 345 and uplink resources 350. For example, the downlink resources 345 may include a number of downlink slots or symbols and the uplink resources 350 may include a number of uplink slots or symbols. The downlink resources 345 and the uplink resources 350 may span the entire BWP 305 in the frequency domain.

The second set of slots 325 associated with the full-duplex communications mode may include a first sub-BWP 330 for downlink communications and a second sub-BWP 335 for uplink communications. In some examples, a guard band (e.g., a set of resources) may separate the first sub-BWP 330 and the second sub-BWP 335. In some examples, the first sub-BWP 330 and the second sub-BWP 335 may span different amounts of resources in the frequency domain. The fourth set of slots 355 associated with the full-duplex communications mode may include a third sub-BWP 360 for downlink communications and a second sub-BWP 365 for uplink communications. In some examples, a guard band may separate the third sub-BWP 360 and the fourth sub-BWP 365. In some examples, the third sub-BWP 360 and the fourth sub-BWP 365 may span different amounts of resources in the frequency domain. In some examples, the first sub-BWP 330 may span the same frequency resources as the third sub-BWP 360, and the second sub-BWP 335 may span the same frequency resources as the fourth sub-BWP 365. In some examples, the first sub-BWP 330 may span different frequency resources than the third sub-BWP 360, and the second sub-BWP 335 may span different frequency resources than the fourth sub-BWP 365.

In some examples, slots or resources in the first set of slots associated with the half-duplex communications mode may be reserved for control communications (e.g., for SSBs). In some examples, configured resources associated with the half-duplex communications mode may be activated during the first set of slots 310 and the third set of slots 340 associated with the half-duplex communications mode and deactivated during the second set of slots 325 and the fourth set of slots 355 associated with the full-duplex communications mode. In some examples, the first set of slots 310 and the third set of slots 340 associated with the half-duplex communications may be associated with a first set of operating parameters (e.g., a beam identifier, a power control parameter, a transmission power, a rank index, a channel quality indicator, a modulation and coding scheme, or a combination thereof), and the second set of slots 325 and the fourth set of slots 355 associated with the full-duplex communications mode may be associated with a different set of operating parameters.

Figure 4:
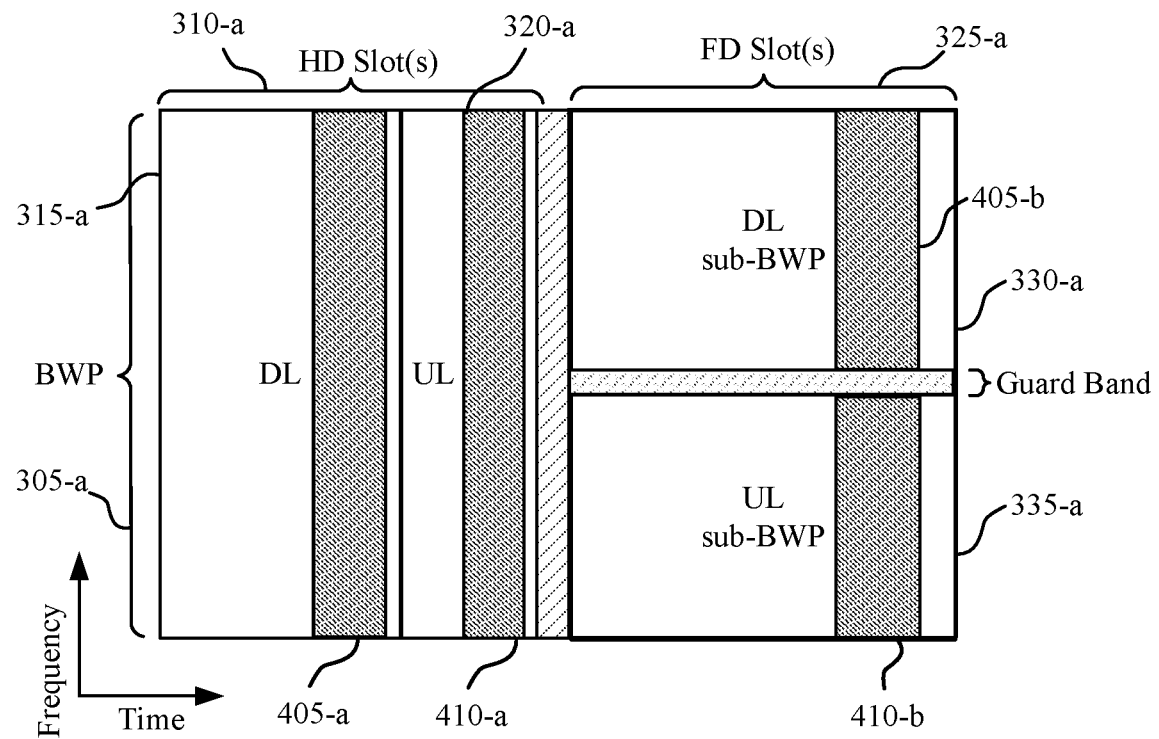
FIG. 4 illustrates an example of a BWP switching pattern that supports configured BWP and resource allocation switching in accordance with aspects of the present disclosure.

FIG. 4 illustrates an example of a BWP switching pattern 400 that supports configured BWP and resource allocation switching in accordance with aspects of the present disclosure. The BWP switching pattern 400 may implement aspects of wireless communications systems 100 or 200. For example, the BWP switching pattern 400 may illustrate an example BWP switching pattern that may be configured and used for communications between a base station 105 and a UE 115 as described herein.

The BWP switching pattern 400 may be used for a BWP 305-*a* (e.g., a portion of a carrier bandwidth) that may be used for communications between a base station 105 and a UE 115. The switching pattern 400 may include a first set of slots 310-*a* associated with a half-duplex communications mode and a second set of slots 325-*a* associated with a full-duplex communications mode. In some examples, a guard period (e.g., one or more guard symbols) may separate the first set of slots 310-*a* associated with the half-duplex communications mode from the second set of slots 325-*a* associated with the full-duplex communications mode.

The first set of slots 310-*a* associated with the half-duplex communications mode may include downlink resources 315-*a* and uplink resources 320-*a*. For example, the downlink resources 315-*a* may include a number of downlink slots or symbols and the uplink resources 320-*a* may include a number of uplink slots or symbols. The downlink resources 315-*a* and the uplink resources 320-*a* may span the entire BWP 305-*a* in the frequency domain. The second set of slots 325-*a* associated with the full-duplex communications mode may include a first sub-BWP 330-*a* for downlink communications and a second sub-BWP 335-*a* for uplink communications. In some examples, a guard band (e.g., a set of resources) may separate the first sub-BWP 330-*a* and the second sub-BWP 335-*a*. In some examples, the first sub-BWP 330-*a* and the second sub-BWP 335-*a* may span different amounts of resources in the frequency domain.

In some examples, for a same configured transmission or reception, the base station 105 may configure and indicate (e.g., via control signaling) resource allocations, operating parameters, and PUCCH resources for the first set of slots 310-*a* associated with the half-duplex communications mode and the second set of slots 325-*a* associated with the full-duplex communications mode.

For example, for the same downlink occasion 405-*a* or 405-*b*, the base station 105 may configure and indicate different resource allocations or operating parameters for the downlink occasion 405-*a* scheduled in the first set of slots 310-*a* associated with the half-duplex communications mode and the downlink occasion 405-*b* scheduled in the second set of slots 325-*a* associated with the full-duplex communications mode. In some examples, the different configured operating parameters may include a demodulation reference signal (DMRS) format, a modulation and coding scheme (MCS), a rank index, a precoding matrix indicator (PMI), or a combination thereof. In some examples, the downlink occasions 405-*a* or 405-*b* may a configured grant occasion, a reference signal, a random access channel occasion, or a search space.

As another example, for the same uplink occasion 410-*a* or 410-*b*, the base station 105 may configure and indicate different resource allocations, PUCCH resources, or operating parameters for the uplink occasion 410-*a* scheduled in the first set of slots 310-*a* associated with the half-duplex communications mode and the uplink occasion 410-*b* scheduled in the second set of slots 325-*a* associated with the full-duplex communications mode. In some examples, the different configured operating parameters may include an MCS, a rank index, a PMI, or a combination thereof. In some examples, the uplink occasions 410-*a* or 410-*b* may be an SPS occasion, a reference signal, a random access channel occasion, or a search space.

Figure 5:
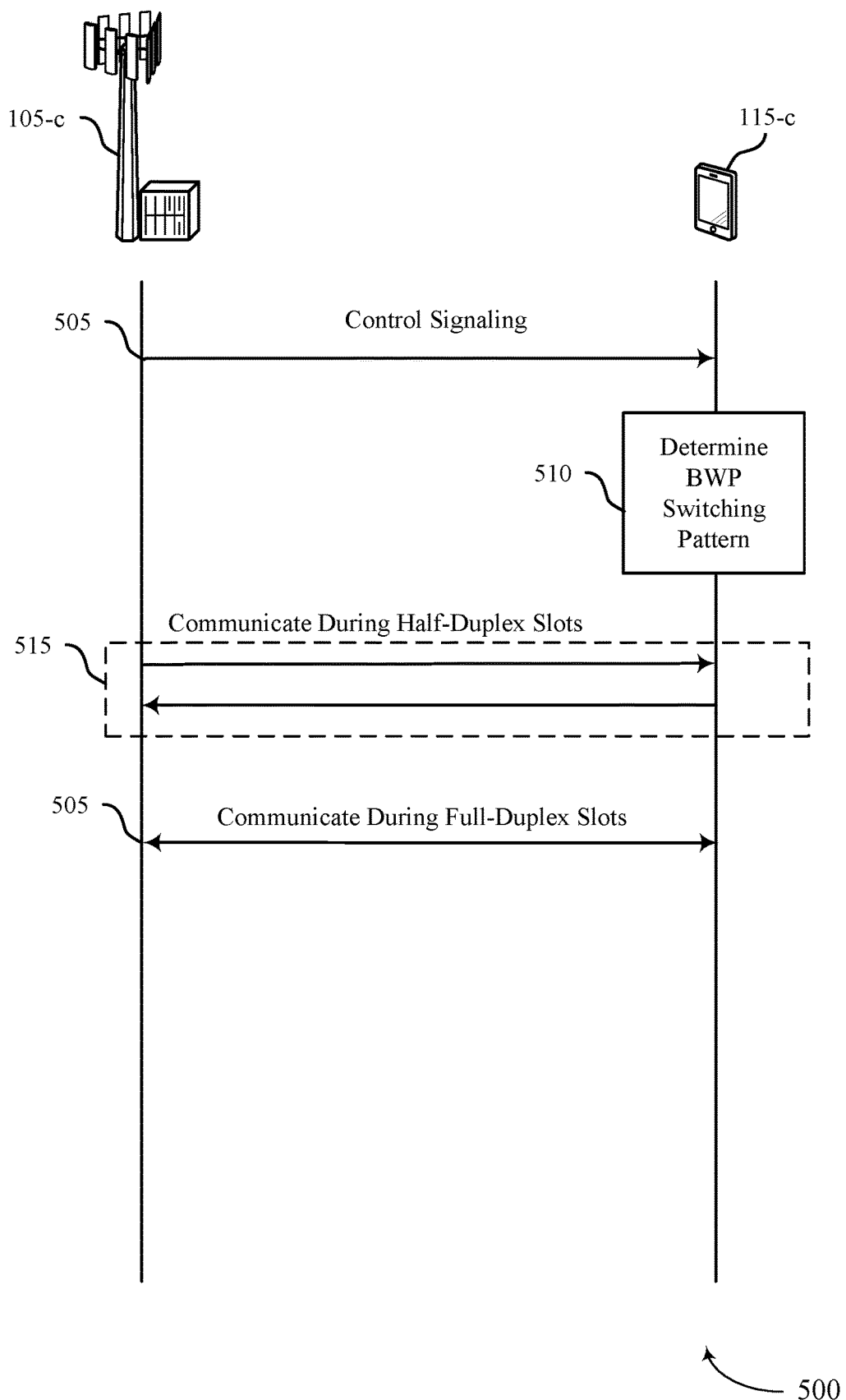
FIG. 5 illustrates an example of a process flow that supports configured BWP and resource allocation switching in accordance with aspects of the present disclosure.

FIG. 5 illustrates an example of a process flow 500 that supports configured BWP and resource allocation switching in accordance with aspects of the present disclosure. In some examples, the process flow 500 may implement aspects of wireless communications systems 100 or 200. The process flow 500 may include a UE 115-*c*, which may be an example of a UE 115 as described herein. The process flow 500 may include a base station 105-*c*, which may be an example of a base station 105 as described herein. In the following description of the process flow 500, the operations between the base station 105-*c* and the UE 115-*c* may be transmitted in a different order than the example order shown, or the operations performed by the base station 105-*c* and the UE 115-*c* may be performed in different orders or at different times. Some operations may also be omitted from the process flow 500, and other operations may be added to the process flow 500.

At 505, the base station 105-*c* may transmit to the UE 115-*c*, control signaling indicating a periodic switching pattern for a BWP of a carrier bandwidth for communications between the base station 105-*c* and the UE 115-*c*. The periodic switching pattern may include a first set of slots associated with a half-duplex communications mode and a second set of slots associated with a full-duplex communications mode. In some examples, the base station 105-*c* may transmit to the UE 115-*c*, with the control signaling, an indication of a first set of parameters associated with the half-duplex communications mode and a second set of parameters associated with the full-duplex communications mode. In some examples, the first and second set of parameters may include a beam identifier, a power control parameter, a transmission power, a rank index, a channel quality indicator, an MCS, or a combination thereof.

In some examples, the control signaling may include an indication of a guard period between the first set of slots associated with the half-duplex communications mode and the second set of slots associated with the full-duplex communications mode. In some examples, the control signaling may indicate that at least one slot of the first set of slots associated with the half-duplex communications mode is reserved for control communications (e.g., an SSB) between the base station 105-c and the UE 115-c.

In some examples, the control signaling may include a first indication of a first set of resource allocations, PUCCH resources, or first operation parameters for a configured transmission or configured reception occurring in the first set of slots associated with the half-duplex communications mode, and a second indication of a second set of resource allocations, PUCCH resources, or second operation parameters for the configured transmission or configured reception occurring in the second set of slots associated with the full-duplex communications mode. In some examples, the configured transmission or configured reception comprises an SPS configuration occasion, a configured grant occasion, a reference signal, a random access channel occasion, or a search space. In some examples, the operating parameters may include a DMRS format, an MCS, a rank index, a PMI, or a combination thereof.

At 510, the UE 115-c may determine the periodic switching pattern for the BWP for communications between the base station 105-c and the UE 115-a based on the control signaling received at 505. In some examples, the UE 115-c may determine operating parameters and resource allocations associated with the first set of slots associated with the half-duplex communications mode and the second set of slots associated with the full-duplex communications mode.

At 515, the base station 105-c and the UE 115-c may communicate during the first set of slots using the BWP.

At 520, the base station 105-c and the UE 115-c may communicate using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, where the first portion of the BWP is different from the second portion of the BWP. In some examples, the control signaling received at 505 may include an indication of the first set of resources and the second set of resources. In some examples, the control signaling received at 505 may include an indication of a guard band in the frequency domain between the first set of resources and the second set of resources. In some examples, only the base station 105-c may communicate in a full-duplex communications mode (e.g., the base station 105-c may transmit downlink signals to the UE 115-c using the first sub-BWP while concurrently receiving uplink signals from a different UE using the second sub-BWP). In some examples, the UE 115-c may communicate in a full-duplex communications mode using the first sub-BWP for receiving downlink signaling and the second sub-BWP for transmitting uplink signaling.

Figure 6:
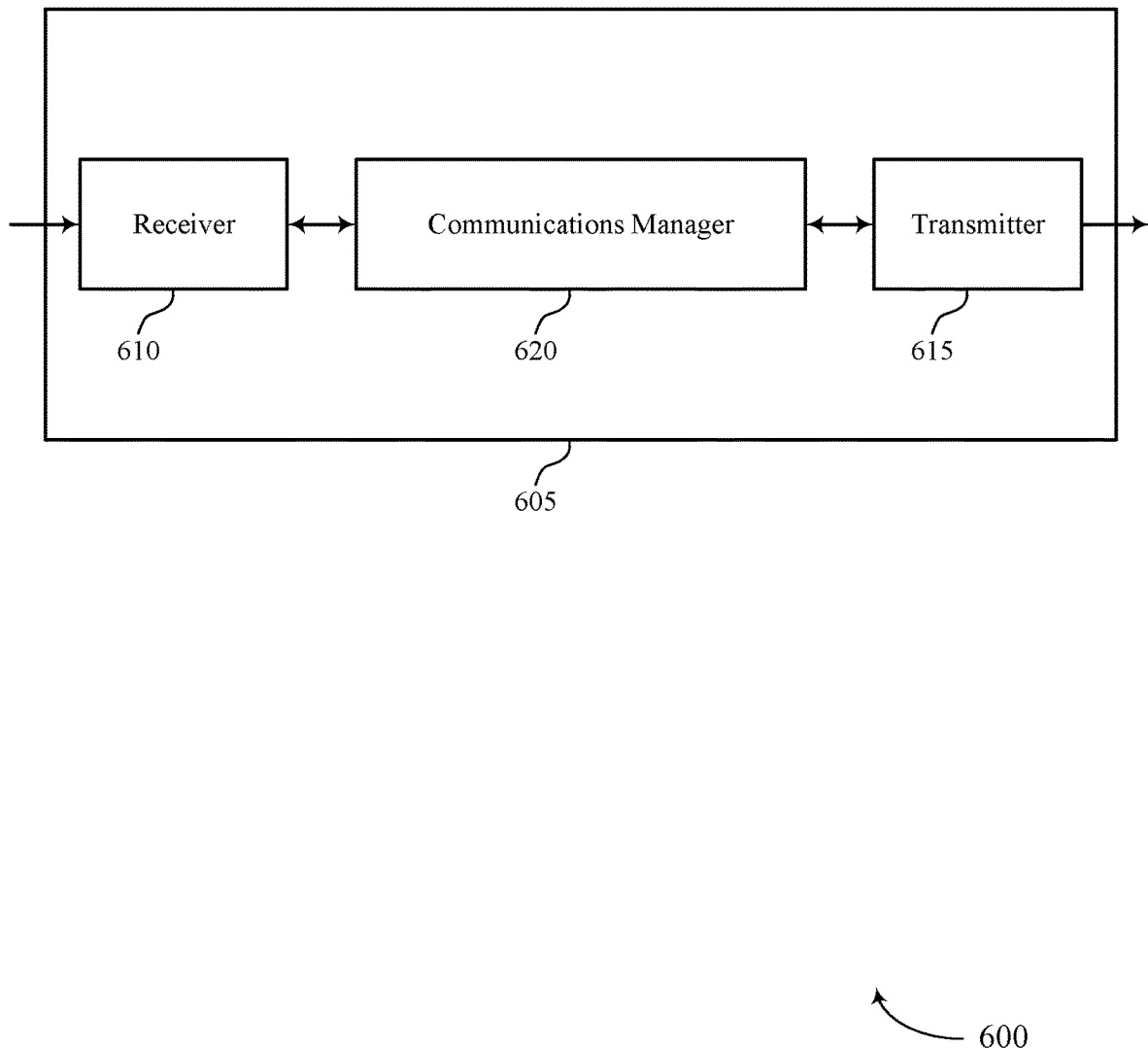
FIGS. 6 and 7 show block diagrams of devices that support configured BWP and resource allocation switching in accordance with aspects of the present disclosure.

FIG. 6 shows a block diagram 600 of a device 605 that supports configured BWP and resource allocation switching in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to configured BWP and resource allocation switching). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to configured BWP and resource allocation switching). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of configured BWP and resource allocation switching as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The communications manager 620 may be configured as or otherwise support a means for communicating with the base station during the first set of slots using the BWP. The communications manager 620 may be configured as or otherwise support a means for communicating with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources by enabling full-duplex and half-duplex communications.

Figure 7:
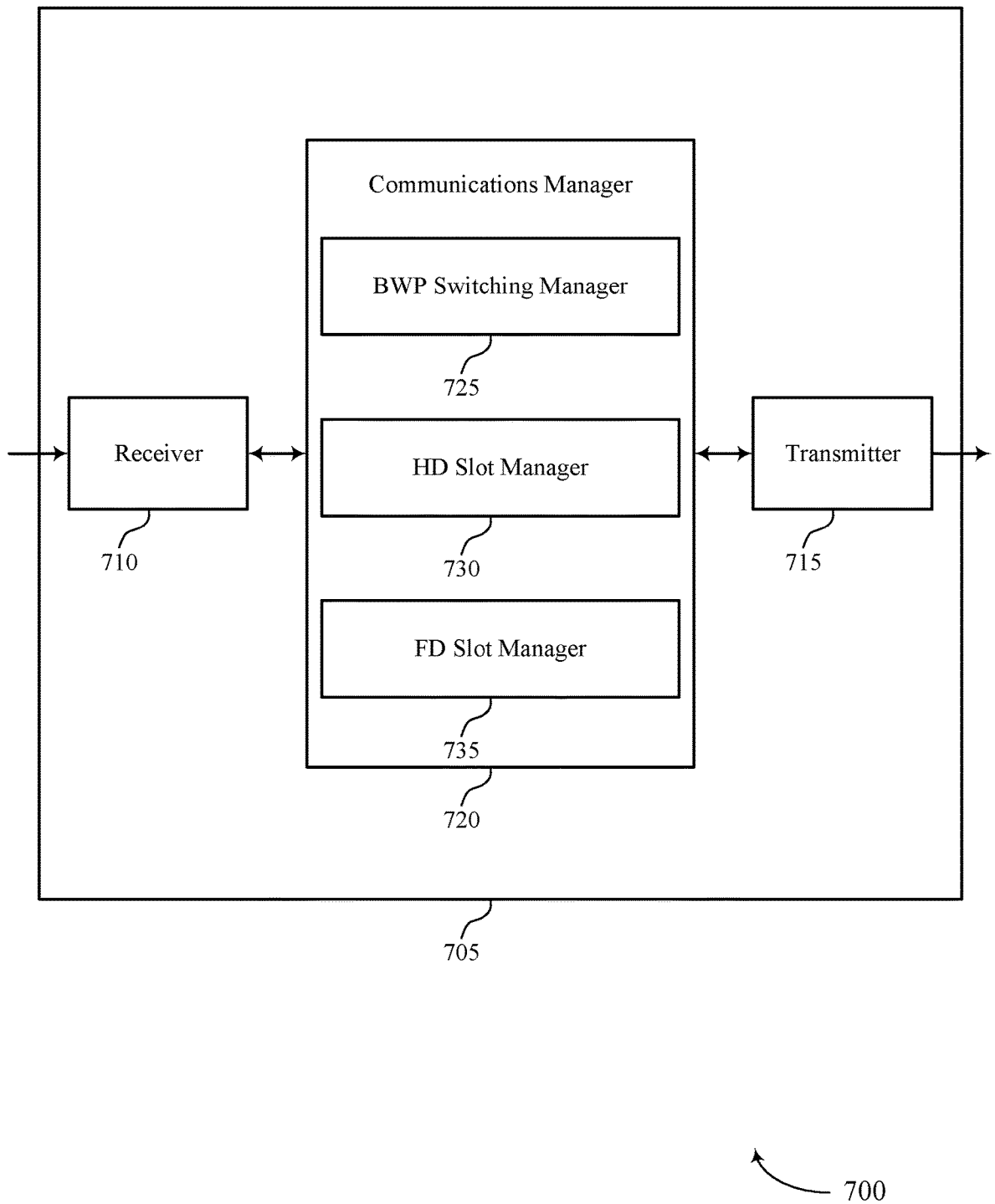

FIG. 7 shows a block diagram 700 of a device 705 that supports configured BWP and resource allocation switching in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to configured BWP and resource allocation switching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to configured BWP and resource allocation switching). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of configured BWP and resource allocation switching as described herein. For example, the communications manager 720 may include a BWP switching manager 725, a half-duplex (HD) slot manager 730, a full-duplex (FD) slot manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The BWP switching manager 725 may be configured as or otherwise support a means for receiving, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The HD slot manager 730 may be configured as or otherwise support a means for communicating with the base station during the first set of slots using the BWP. The FD slot manager 735 may be configured as or otherwise support a means for communicating with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

Figure 8:
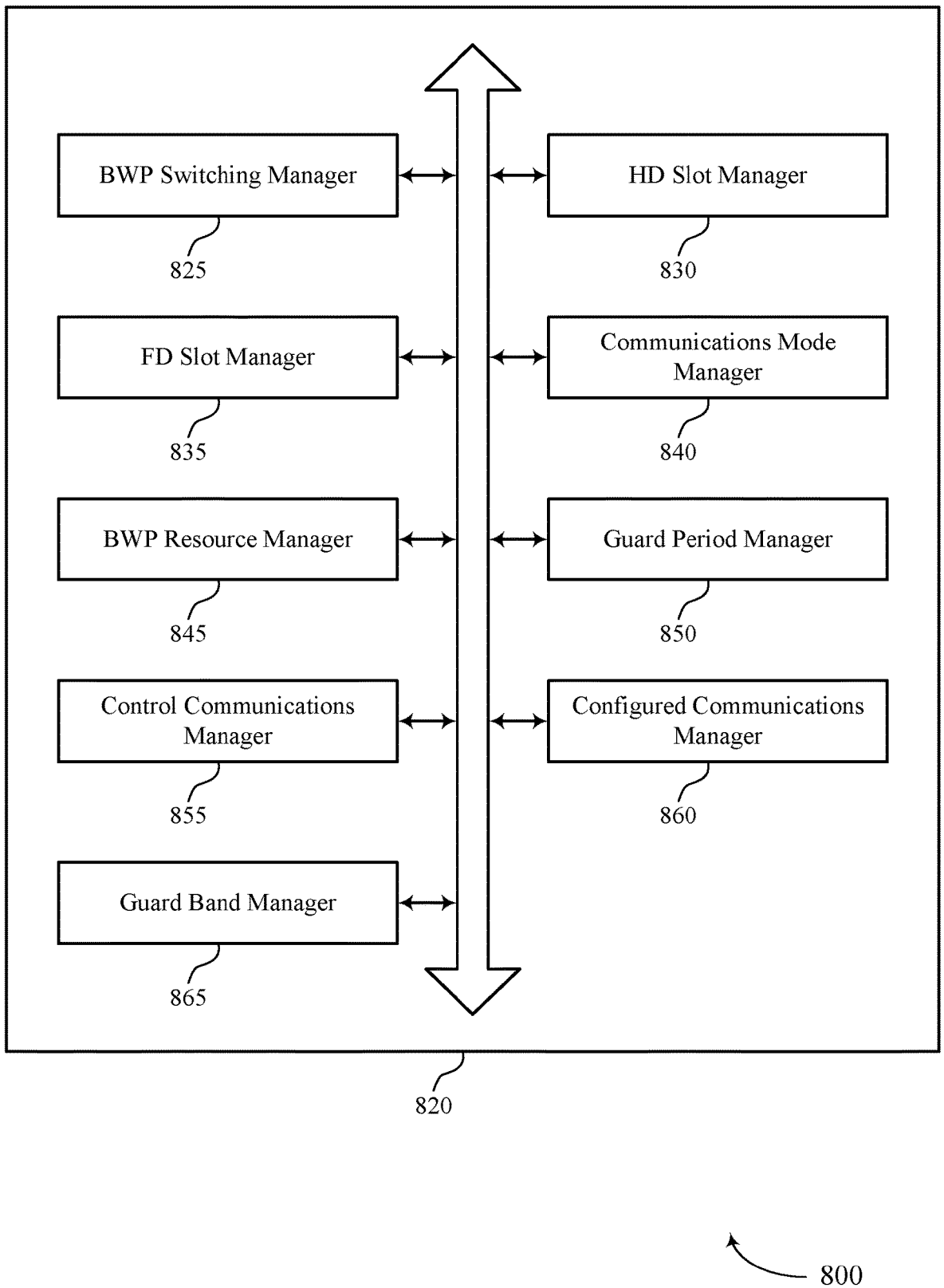
FIG. 8 shows a block diagram of a communications manager that supports configured BWP and resource allocation switching in accordance with aspects of the present disclosure.

FIG. 8 shows a block diagram 800 of a communications manager 820 that supports configured BWP and resource allocation switching in accordance with aspects of the present disclosure. The communications manager 820 may be an example of aspects of a communications manager 620, a communications manager 720, or both, as described herein. The communications manager 820, or various components thereof, may be an example of means for performing various aspects of configured BWP and resource allocation switching as described herein. For example, the communications manager 820 may include a BWP switching manager 825, an HD slot manager 830, an FD slot manager 835, a Communications mode manager 840, a BWP resource manager 845, a Guard period manager 850, a Control communications manager 855, a Configured communications manager 860, a Guard band manager 865, or any combination thereof. Each of these components may communicate, directly or indirectly, with one another (e.g., via one or more buses).

The communications manager 820 may support wireless communications at a UE in accordance with examples as disclosed herein. The BWP switching manager 825 may be configured as or otherwise support a means for receiving, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The HD slot manager 830 may be configured as or otherwise support a means for communicating with the base station during the first set of slots using the BWP. The FD slot manager 835 may be configured as or otherwise support a means for communicating with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

In some examples, the Communications mode manager 840 may be configured as or otherwise support a means for receiving, with the control signaling, an indication of a first set of parameters associated with the half-duplex communications mode and a second set of parameters associated with the full-duplex communications mode.

In some examples, the first set of parameters and the second set of parameters include a beam identifier, a power control parameter, a transmission power, a rank index, a channel quality indicator, a modulation and coding scheme, or a combination thereof.

In some examples, the BWP resource manager 845 may be configured as or otherwise support a means for receiving, with the control signaling, an indication of the first set of resources and the second set of resources.

In some examples, the Guard band manager 865 may be configured as or otherwise support a means for receiving, with the control signaling, a second indication of a guard band in the frequency domain between the first set of resources and the second set of resources.

In some examples, the Guard period manager 850 may be configured as or otherwise support a means for receiving, with the control signaling, an indication of a guard period between the first set of slots associated with the half-duplex communications mode and the second set of slots associated with the full-duplex communications mode.

In some examples, the Control communications manager 855 may be configured as or otherwise support a means for receiving, with the control signaling, an indication that at least one slot of the first set of slots associated with the half-duplex communications mode is reserved for control communications with the base station.

In some examples, the control communications includes a synchronization signal block.

In some examples, the Configured communications manager 860 may be configured as or otherwise support a means for receiving, with the control signaling, a first indication of a first set of resource allocations, PUCCH resources, or first operation parameters for a configured transmission or configured reception occurring in the first set of slots associated with the half-duplex communications mode, and a second indication of a second set of resource allocations, PUCCH resources, or second operation parameters for the configured transmission or configured reception occurring in the second set of slots associated with the full-duplex communications mode.

In some examples, the configured transmission or configured reception includes a semi-persistent scheduling configuration occasion, a configured grant, a reference signal, a random access channel occasion, or a search space.

In some examples, the first operation parameters and the second operation parameters include a demodulation reference signal format, a modulation and coding scheme, a rank index, a precoding matrix indicator, or a combination thereof.

In some examples, to support receiving the control signaling, the BWP switching manager 825 may be configured as or otherwise support a means for receiving the control signaling via a downlink control information message, a radio resource control message, or a MAC-CE message.

In some examples, to support communicating with the base station during the second set of slots, the FD slot manager 835 may be configured as or otherwise support a means for communicating with the base station in the full-duplex communications mode using the first sub-BWP for receiving downlink signaling and the second sub-BWP for transmitting uplink signaling.

Figure 9:
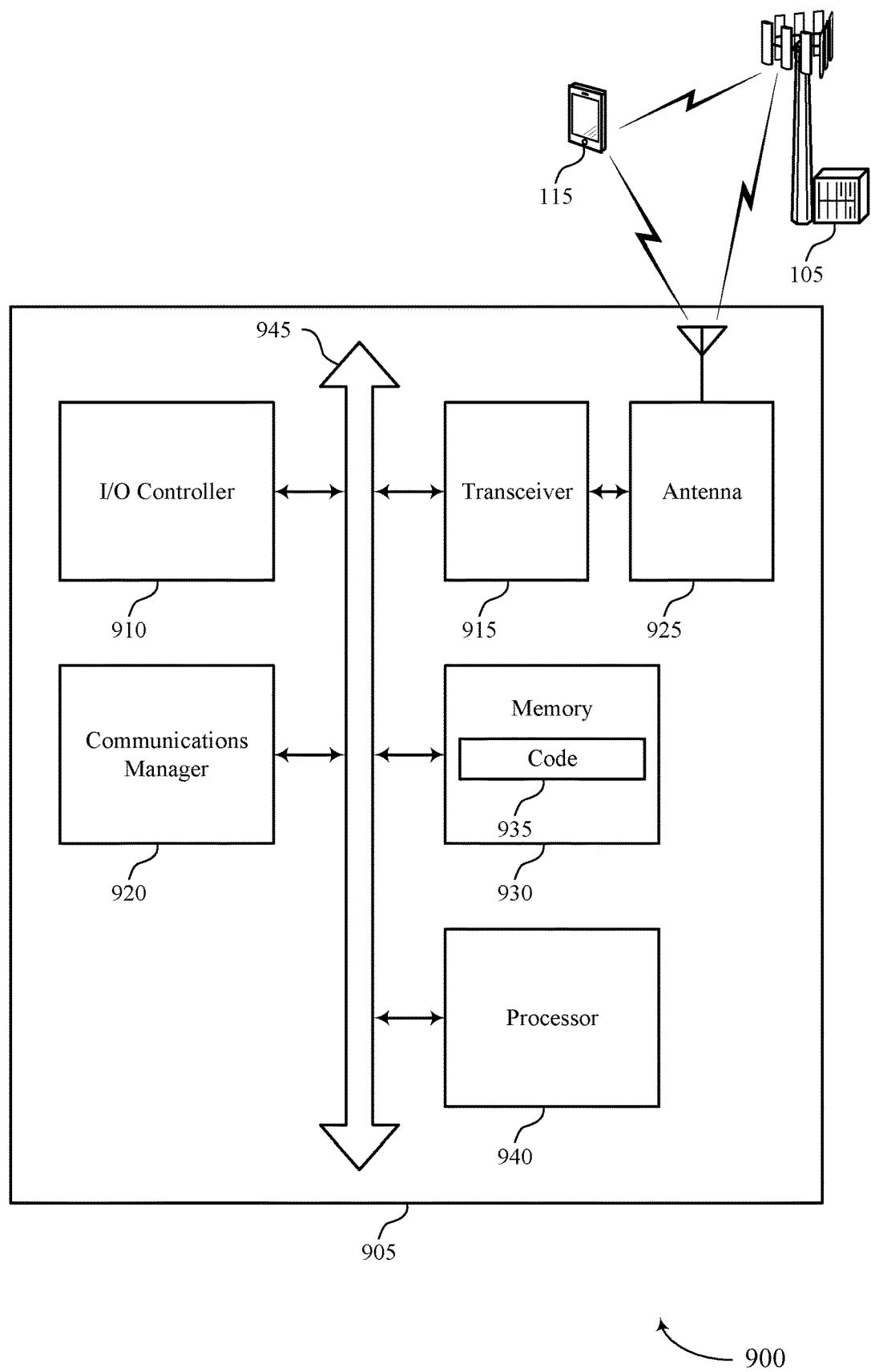
FIG. 9 shows a diagram of a system including a device that supports configured BWP and resource allocation switching in accordance with aspects of the present disclosure.

FIG. 9 shows a diagram of a system 900 including a device 905 that supports configured BWP and resource allocation switching in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting configured BWP and resource allocation switching). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The communications manager 920 may be configured as or otherwise support a means for communicating with the base station during the first set of slots using the BWP. The communications manager 920 may be configured as or otherwise support a means for communicating with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

By including or configuring the communications manager 920 in accordance with examples as described herein, the device 905 may support techniques for reduced latency and more efficient utilization of communication resources by enabling full-duplex and half-duplex communications.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of configured BWP and resource allocation switching as described herein, or the processor 940 and the memory 930 may be otherwise configured to perform or support such operations.

Figure 10:
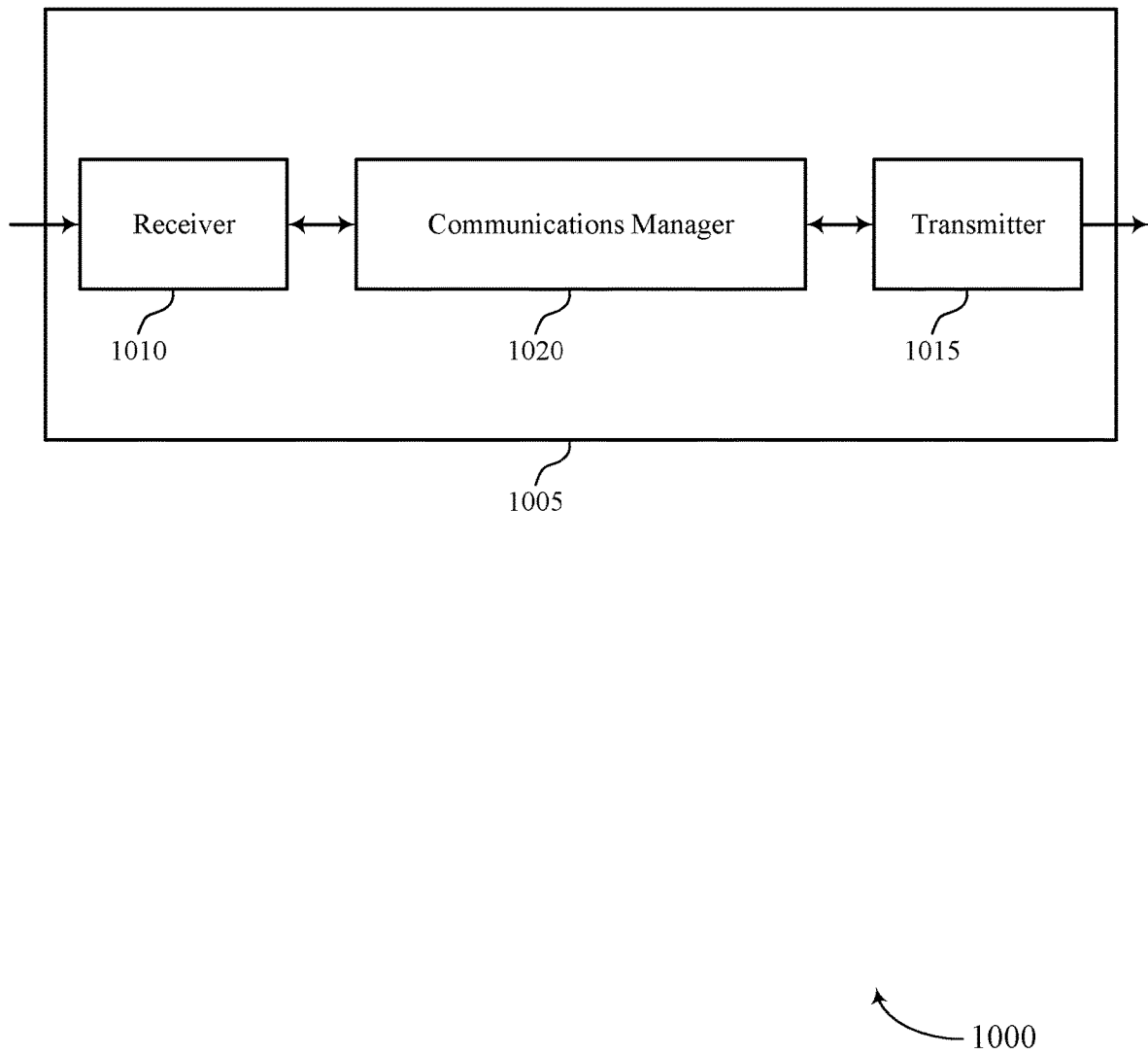
FIGS. 10 and 11 show block diagrams of devices that support configured BWP and resource allocation switching in accordance with aspects of the present disclosure.

FIG. 10 shows a block diagram 1000 of a device 1005 that supports configured BWP and resource allocation switching in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to configured BWP and resource allocation switching). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to configured BWP and resource allocation switching). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of configured BWP and resource allocation switching as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The communications manager 1020 may be configured as or otherwise support a means for communicating with the UE during the first set of slots using the BWP. The communications manager 1020 may be configured as or otherwise support a means for communicating with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources by enabling full-duplex and half-duplex communications.

Figure 11:
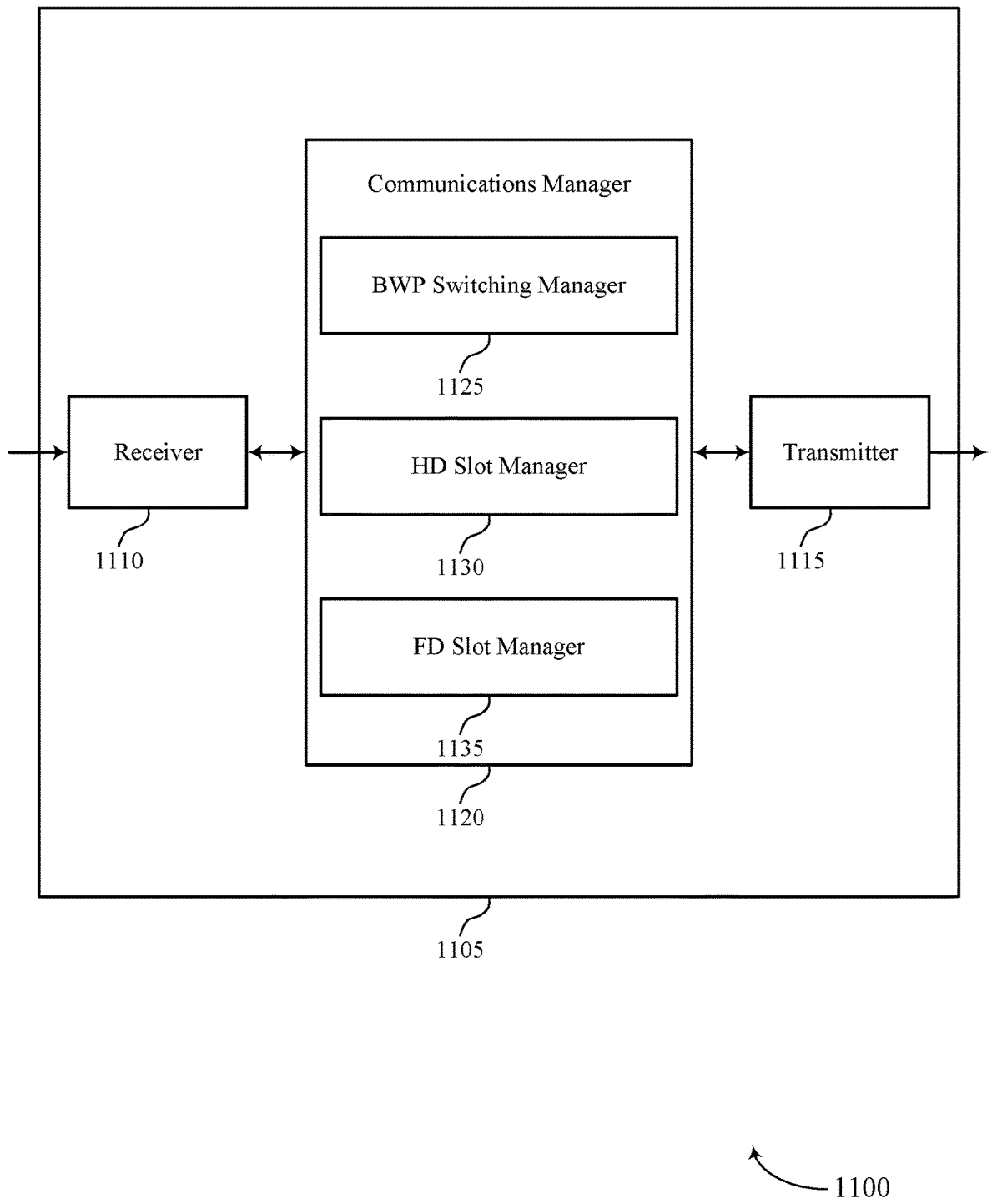

FIG. 11 shows a block diagram 1100 of a device 1105 that supports configured BWP and resource allocation switching in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to configured BWP and resource allocation switching). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to configured BWP and resource allocation switching). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of configured BWP and resource allocation switching as described herein. For example, the communications manager 1120 may include a BWP switching manager 1125, an HD slot manager 1130, an FD slot manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The BWP switching manager 1125 may be configured as or otherwise support a means for transmitting, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The HD slot manager 1130 may be configured as or otherwise support a means for communicating with the UE during the first set of slots using the BWP. The FD slot manager 1135 may be configured as or otherwise support a means for communicating with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

Figure 12:
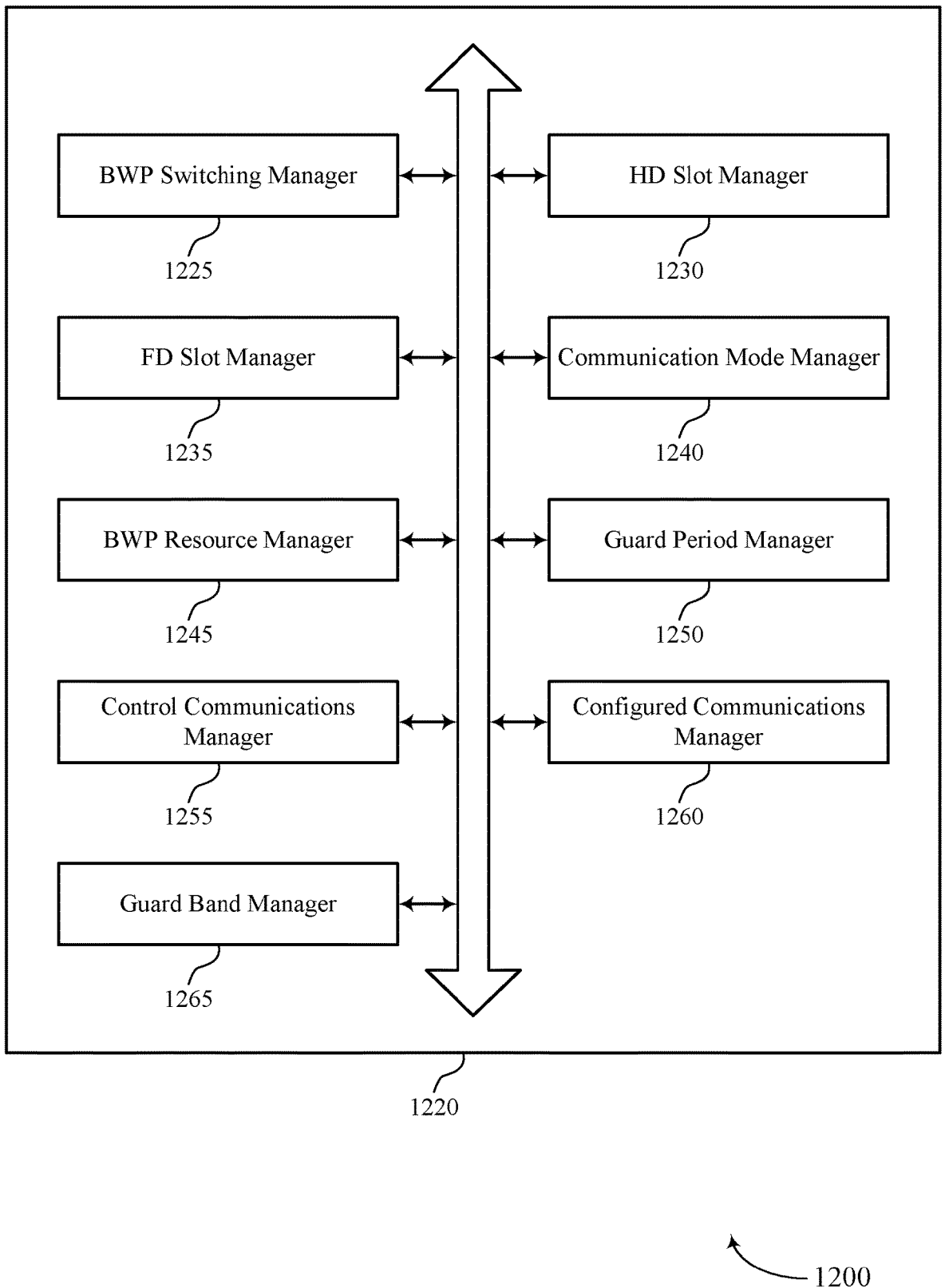
FIG. 12 shows a block diagram of a communications manager that supports configured BWP and resource allocation switching in accordance with aspects of the present disclosure.

FIG. 12 shows a block diagram 1200 of a communications manager 1220 that supports configured BWP and resource allocation switching in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of configured BWP and resource allocation switching as described herein. For example, the communications manager 1220 may include a BWP switching manager 1225, an HD slot manager 1230, an FD slot manager 1235, a Communication mode manager

1240, a BWP resource manager 1245, a Guard period manager 1250, a Control communications manager 1255, a Configured communications manager 1260, a Guard band manager 1265, or any combination thereof. Each of these components may communicate, directly or indirectly, with one another (e.g., via one or more buses).

The communications manager 1220 may support wireless communications at a base station in accordance with examples as disclosed herein. The BWP switching manager 1225 may be configured as or otherwise support a means for transmitting, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The HD slot manager 1230 may be configured as or otherwise support a means for communicating with the UE during the first set of slots using the BWP. The FD slot manager 1235 may be configured as or otherwise support a means for communicating with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

In some examples, the BWP switching manager 1225 may be configured as or otherwise support a means for transmitting, to a second UE, second control signaling indicating the periodic switching pattern for the BWP for communications between the base station and the second UE.

In some examples, the BWP switching manager 1225 may be configured as or otherwise support a means for transmitting, to a second UE, second control signaling indicating a second periodic switching pattern for the BWP for communications between the base station and the second UE, the second periodic switching pattern including a third set of slots associated with the half-duplex communications mode and a fourth set of slots associated with the full-duplex communications mode, the third set of slots different from the first set of slots and the fourth set of slots different from the second set of slots. In some examples, the HD slot manager 1230 may be configured as or otherwise support a means for communicating with the second UE during the third set of slots using the BWP. In some examples, the FD slot manager 1235 may be configured as or otherwise support a means for communicating with the second UE during the fourth set of slots using at least one of a third sub-BWP configured for downlink signaling for the fourth set of slots and a fourth sub-BWP configured for uplink signaling for the fourth set of slots, where the third sub-BWP includes a third set of resources spanning at least a third portion of the BWP in the frequency domain and the fourth sub-BWP includes a fourth set of resources spanning at least a fourth portion of the BWP in the frequency domain, the third portion different from the fourth portion.

In some examples, the BWP switching manager 1225 may be configured as or otherwise support a means for transmitting, to a second UE, second control signaling indicating a second periodic switching pattern for a second BWP of the carrier bandwidth for communications between the base station and the second UE, the second periodic switching pattern including a third set of slots associated with the half-duplex communications mode and a fourth set of slots associated with the full-duplex communications mode, the second BWP different from the BWP. In some examples, the HD slot manager 1230 may be configured as or otherwise support a means for communicating with the second UE during the third set of slots using the second BWP. In some examples, the FD slot manager 1235 may be configured as or otherwise support a means for communicating with the second UE during the fourth set of slots using at least one of a third sub-BWP configured for downlink signaling for the fourth set of slots and a fourth sub-BWP configured for uplink signaling for the fourth set of slots, where the third sub-BWP includes a third set of resources spanning at least a third portion of the second BWP in the frequency domain and the fourth sub-BWP includes a fourth set of resources spanning at least a fourth portion of the second BWP in the frequency domain, the third portion different from the fourth portion.

In some examples, the Communication mode manager 1240 may be configured as or otherwise support a means for transmitting, with the control signaling, an indication of a first set of parameters associated with the half-duplex communications mode and a second set of parameters associated with the full-duplex communications mode.

In some examples, the first set of parameters and the second set of parameters include a beam identifier, a power control parameter, a transmission power, a rank index, a channel quality indicator, a modulation and coding scheme, or a combination thereof.

In some examples, the BWP resource manager 1245 may be configured as or otherwise support a means for transmitting, with the control signaling, an indication of the first set of resources and the second set of resources.

In some examples, the Guard band manager 1265 may be configured as or otherwise support a means for transmitting, with the control signaling, a second indication of a guard band in the frequency domain between the first set of resources and the second set of resources.

In some examples, the Guard period manager 1250 may be configured as or otherwise support a means for transmitting, with the control signaling, an indication of a guard period between the first set of slots associated with the half-duplex communications mode and the second set of slots associated with the full-duplex communications mode.

In some examples, the Control communications manager 1255 may be configured as or otherwise support a means for transmitting, with the control signaling, an indication that at least one slot of the first set of slots associated with the half-duplex communications mode is reserved for control communications with the base station.

In some examples, the control communications includes a synchronization signal block.

In some examples, the Configured communications manager 1260 may be configured as or otherwise support a means for transmitting, with the control signaling, a first indication of a first set of resource allocations, a PUCCH resources, or first operation parameters for a configured transmission or configured reception occurring in the first set of slots associated with the half-duplex communications mode, and a second indication of a second set of resource allocations, PUCCH resources, or second operation parameters for the configured transmission or configured reception occurring in the second set of slots associated with the full-duplex communications mode.

In some examples, the configured transmission or configured reception includes a semi-persistent scheduling configuration occasion, a configured grant, a reference signal, a random access channel occasion, or a search space.

In some examples, the first operation parameters and the second operation parameters include a demodulation reference signal format, a modulation and coding scheme, a rank index, a precoding matrix indicator, or a combination thereof.

In some examples, to support transmitting the control signaling, the BWP switching manager 1225 may be configured as or otherwise support a means for transmitting the control signaling via a downlink control information message, a radio resource control message, or a MAC-CE message.

In some examples, to support communicating with the UE during the second set of slots, the FD slot manager 1235 may be configured as or otherwise support a means for communicating with the UE in the full-duplex communications mode using the first sub-BWP for transmitting downlink signaling and the second sub-BWP for receiving uplink signaling.

Figure 13:
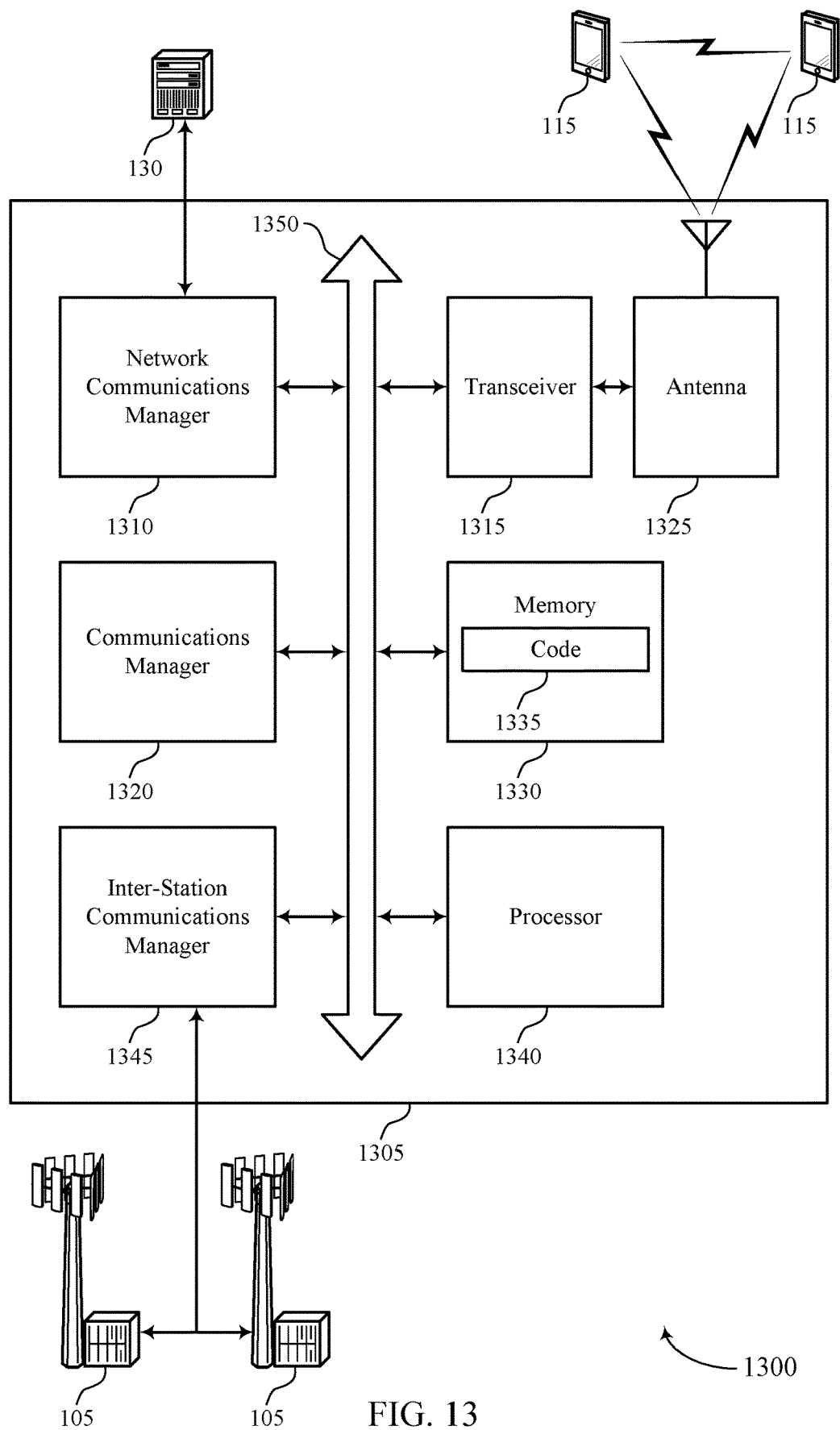
FIG. 13 shows a diagram of a system including a device that supports configured BWP and resource allocation switching in accordance with aspects of the present disclosure.

FIG. 13 shows a diagram of a system 1300 including a device 1305 that supports configured BWP and resource allocation switching in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting configured BWP and resource allocation switching). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The communications manager 1320 may be configured as or otherwise support a means for communicating with the UE during the first set of slots using the BWP. The communications manager 1320 may be configured as or otherwise support a means for communicating with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion.

By including or configuring the communications manager 1320 in accordance with examples as described herein, the device 1305 may support techniques for reduced latency and more efficient utilization of communication resources by enabling full-duplex and half-duplex communications.

In some examples, the communications manager 1320 may be configured to perform various operations (e.g., receiving, monitoring, transmitting) using or otherwise in cooperation with the transceiver 1315, the one or more antennas 1325, or any combination thereof. For example, the communications manager 1320 may be configured to receive or transmit messages or other signaling as described herein via the transceiver 1315. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of configured BWP and resource allocation switching as described herein, or the processor 1340 and the memory 1330 may be otherwise configured to perform or support such operations.

Figure 14:
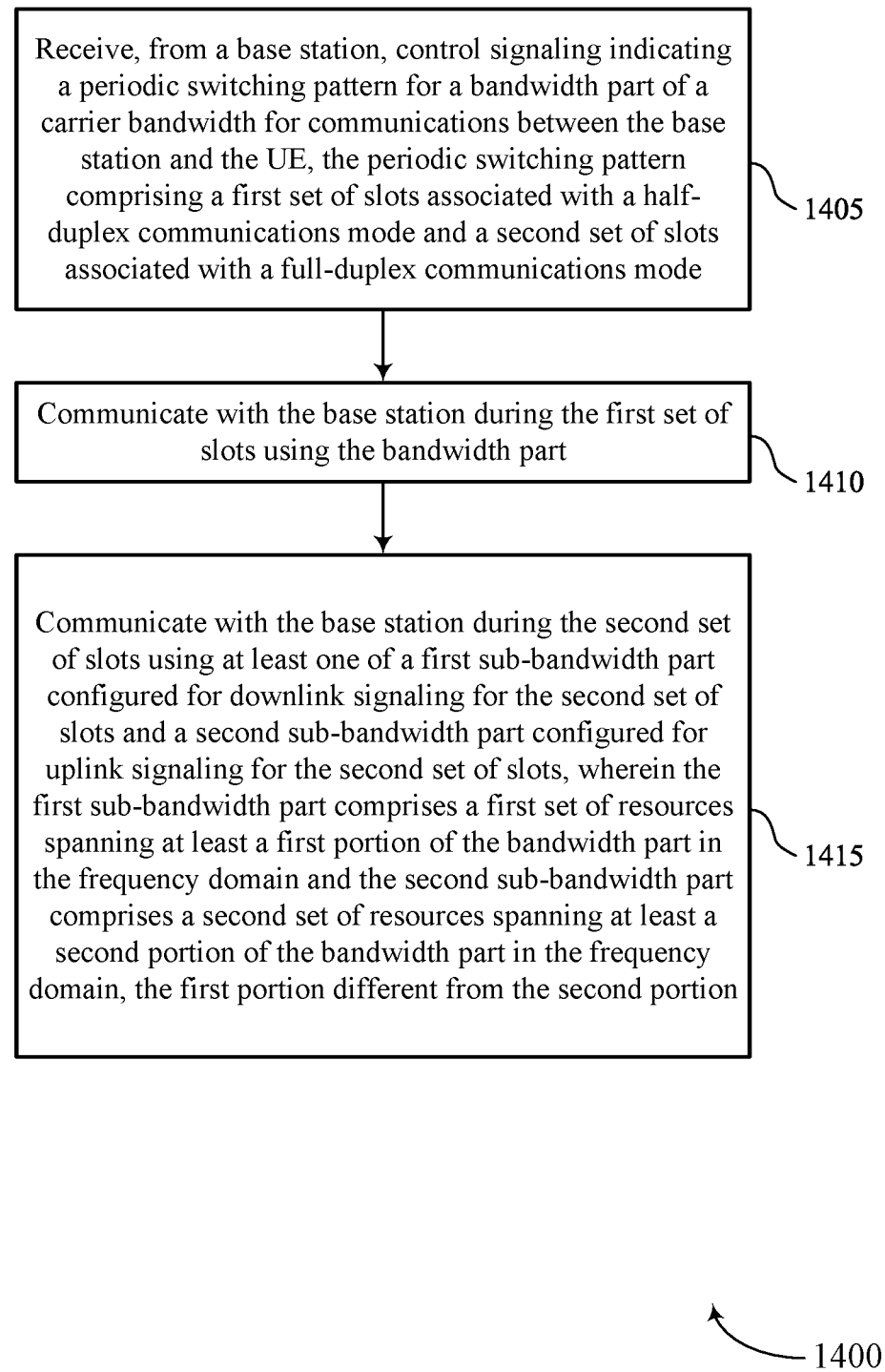
FIGS. 14 through 17 show flowcharts illustrating methods that support configured BWP and resource allocation switching in accordance with aspects of the present disclosure.

FIG. 14 shows a flowchart illustrating a method 1400 that supports configured BWP and resource allocation switching in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The operations of 1405 may be performed in accordance with examples as disclosed herein. In some examples, aspects of the operations of 1405 may be performed by a BWP switching manager 825 as described with reference to FIG. 8. Additionally or alternatively, means for performing 1405 may, but not necessarily, include, for example, antenna 925, transceiver 915, communications manager 920, memory 930 (including code 935), processor 940 and/or bus 945.

At 1410, the method may include communicating with the base station during the first set of slots using the BWP. The operations of 1410 may be performed in accordance with examples as disclosed herein. In some examples, aspects of the operations of 1410 may be performed by an HD slot manager 830 as described with reference to FIG. 8. Additionally or alternatively, means for performing 1410 may, but not necessarily, include, for example, antenna 925, transceiver 915, communications manager 920, memory 930 (including code 935), processor 940 and/or bus 945.

At 1415, the method may include communicating with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion. The operations of 1415 may be performed in accordance with examples as disclosed herein. In some examples, aspects of the operations of 1415 may be performed by an FD slot manager 835 as described with reference to FIG. 8. Additionally or alternatively, means for performing 1415 may, but not necessarily, include, for example, antenna 925, transceiver 915, communications manager 920, memory 930 (including code 935), processor 940 and/or bus 945.

Figure 15:
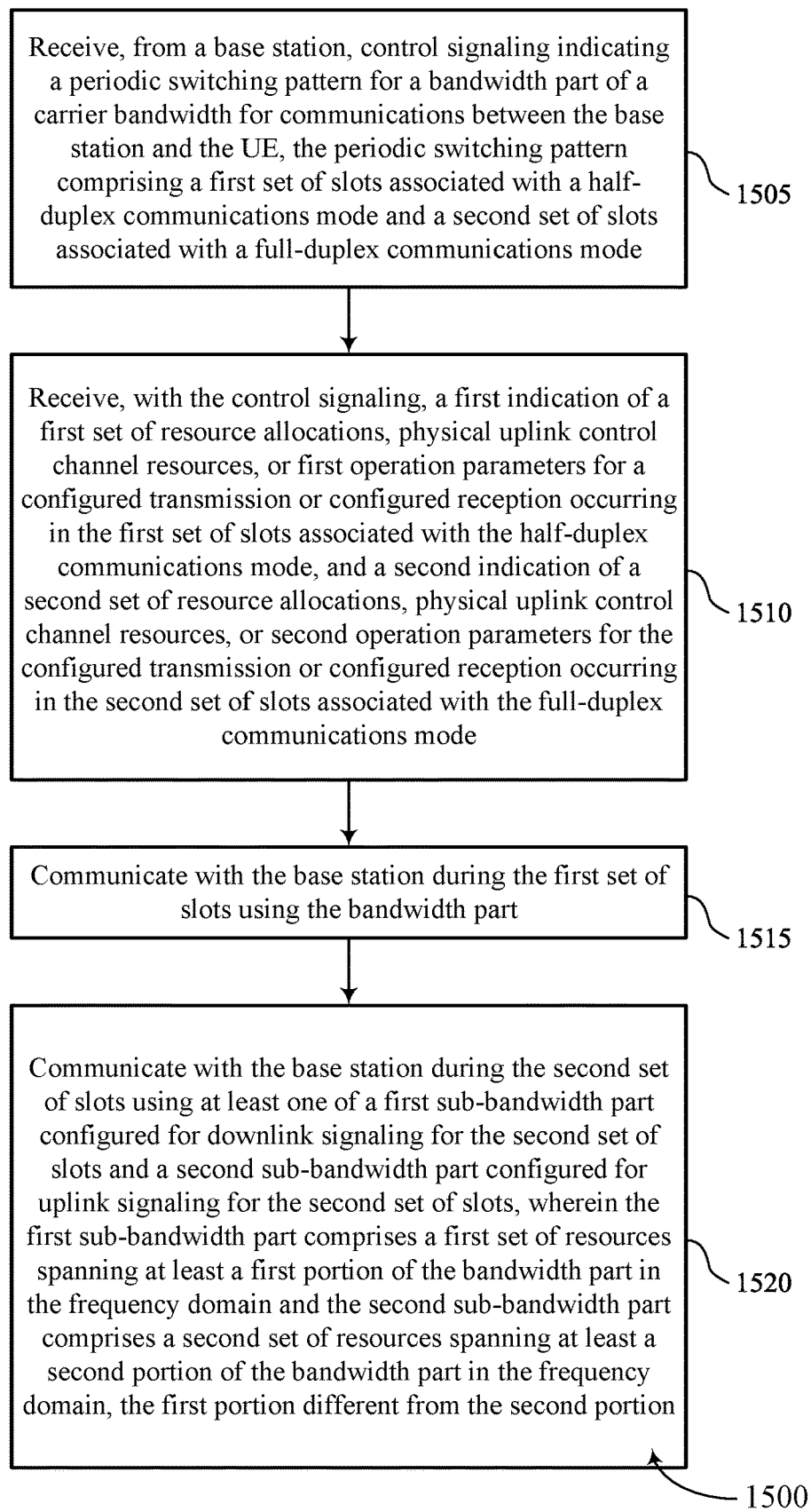

FIG. 15 shows a flowchart illustrating a method 1500 that supports configured BWP and resource allocation switching in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The operations of 1505 may be performed in accordance with examples as disclosed herein. In some examples, aspects of the operations of 1505 may be performed by a BWP switching manager 825 as described with reference to FIG. 8. Additionally or alternatively, means for performing 1505 may, but not necessarily, include, for example, antenna 925, transceiver 915, communications manager 920, memory 930 (including code 935), processor 940 and/or bus 945.

At 1510, the method may include receiving, with the control signaling, a first indication of a first set of resource allocations, PUCCH resources, or first operation parameters for a configured transmission or configured reception occurring in the first set of slots associated with the half-duplex communications mode, and a second indication of a second set of resource allocations, PUCCH resources, or second operation parameters for the configured transmission or configured reception occurring in the second set of slots associated with the full-duplex communications mode. The operations of 1510 may be performed in accordance with examples as disclosed herein. In some examples, aspects of the operations of 1510 may be performed by a Configured communications manager 860 as described with reference to FIG. 8. Additionally or alternatively, means for performing 1510 may, but not necessarily, include, for example, antenna 925, transceiver 915, communications manager 920, memory 930 (including code 935), processor 940 and/or bus 945.

At 1515, the method may include communicating with the base station during the first set of slots using the BWP. The operations of 1515 may be performed in accordance with examples as disclosed herein. In some examples, aspects of the operations of 1515 may be performed by an HD slot manager 830 as described with reference to FIG. 8. Additionally or alternatively, means for performing 1515 may, but not necessarily, include, for example, antenna 925, transceiver 915, communications manager 920, memory 930 (including code 935), processor 940 and/or bus 945.

At 1520, the method may include communicating with the base station during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion. The operations of 1520 may be performed in accordance with examples as disclosed herein. In some examples, aspects of the operations of 1520 may be performed by an FD slot manager 835 as described with reference to FIG. 8. Additionally or alternatively, means for performing 1520 may, but not necessarily, include, for example, antenna 925, transceiver 915, communications manager 920, memory 930 (including code 935), processor 940 and/or bus 945.

Figure 16:
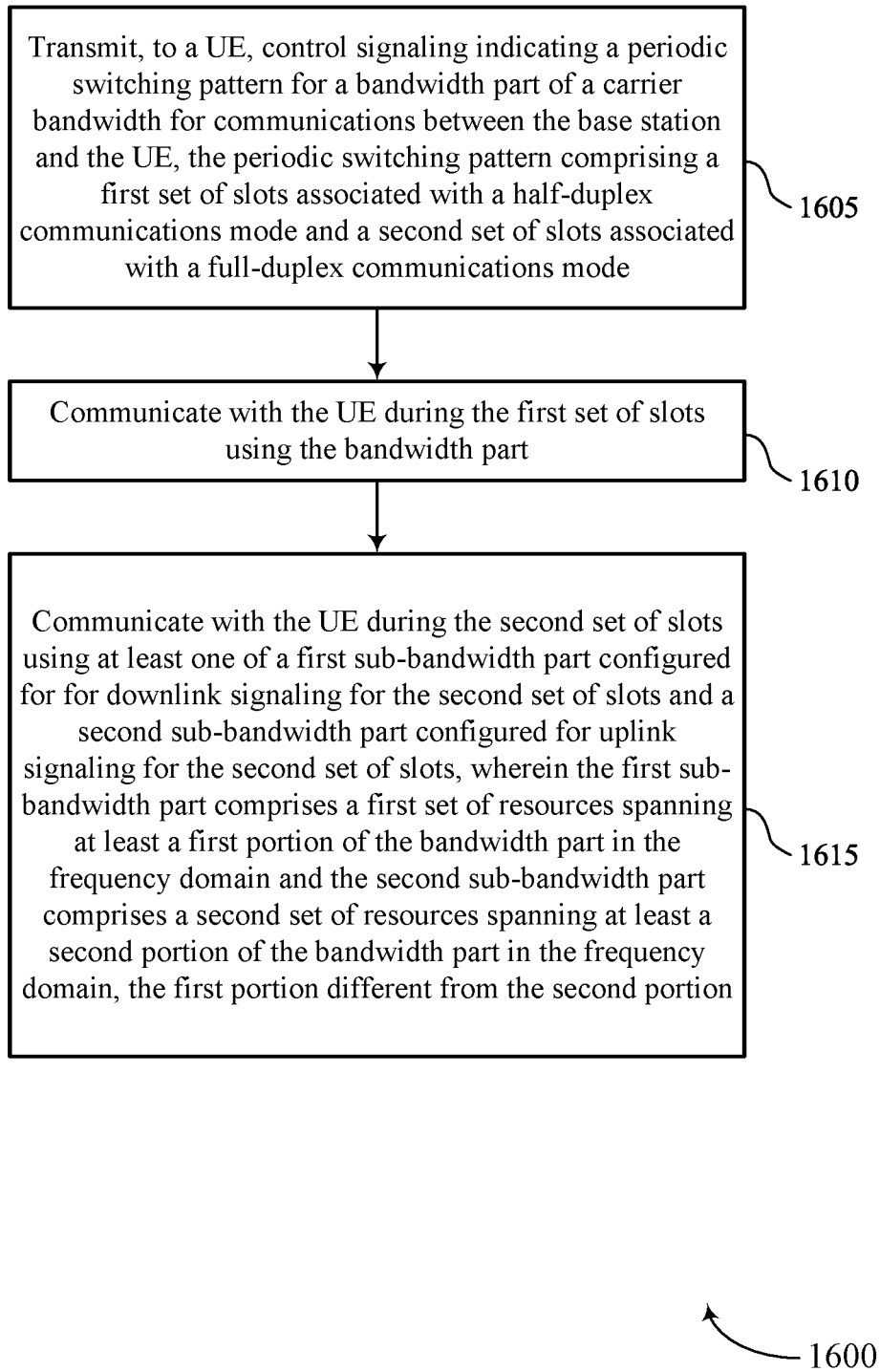

FIG. 16 shows a flowchart illustrating a method 1600 that supports configured BWP and resource allocation switching in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The operations of 1605 may be performed in accordance with examples as disclosed herein. In some examples, aspects of the operations of 1605 may be performed by a BWP switching manager 1225 as described with reference to FIG. 12. Additionally or alternatively, means for performing 1605 may, but not necessarily, include, for example, antenna 1325, transceiver 1315, communications manager 1320, memory 1330 (including code 1335), processor 1340 and/or bus 1350.

At 1610, the method may include communicating with the UE during the first set of slots using the BWP. The operations of 1610 may be performed in accordance with examples as disclosed herein. In some examples, aspects of the operations of 1610 may be performed by an HD slot manager 1230 as described with reference to FIG. 12. Additionally or alternatively, means for performing 1610 may, but not necessarily, include, for example, antenna 1325, transceiver 1315, communications manager 1320, memory 1330 (including code 1335), processor 1340 and/or bus 1350.

At 1615, the method may include communicating with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion. The operations of 1615 may be performed in accordance with examples as disclosed herein. In some examples, aspects of the operations of 1615 may be performed by an FD slot manager 1235 as described with reference to FIG. 12. Additionally or alternatively, means for performing 1615 may, but not necessarily, include, for example, antenna 1325, transceiver 1315, communications manager 1320, memory 1330 (including code 1335), processor 1340 and/or bus 1350.

Figure 17:
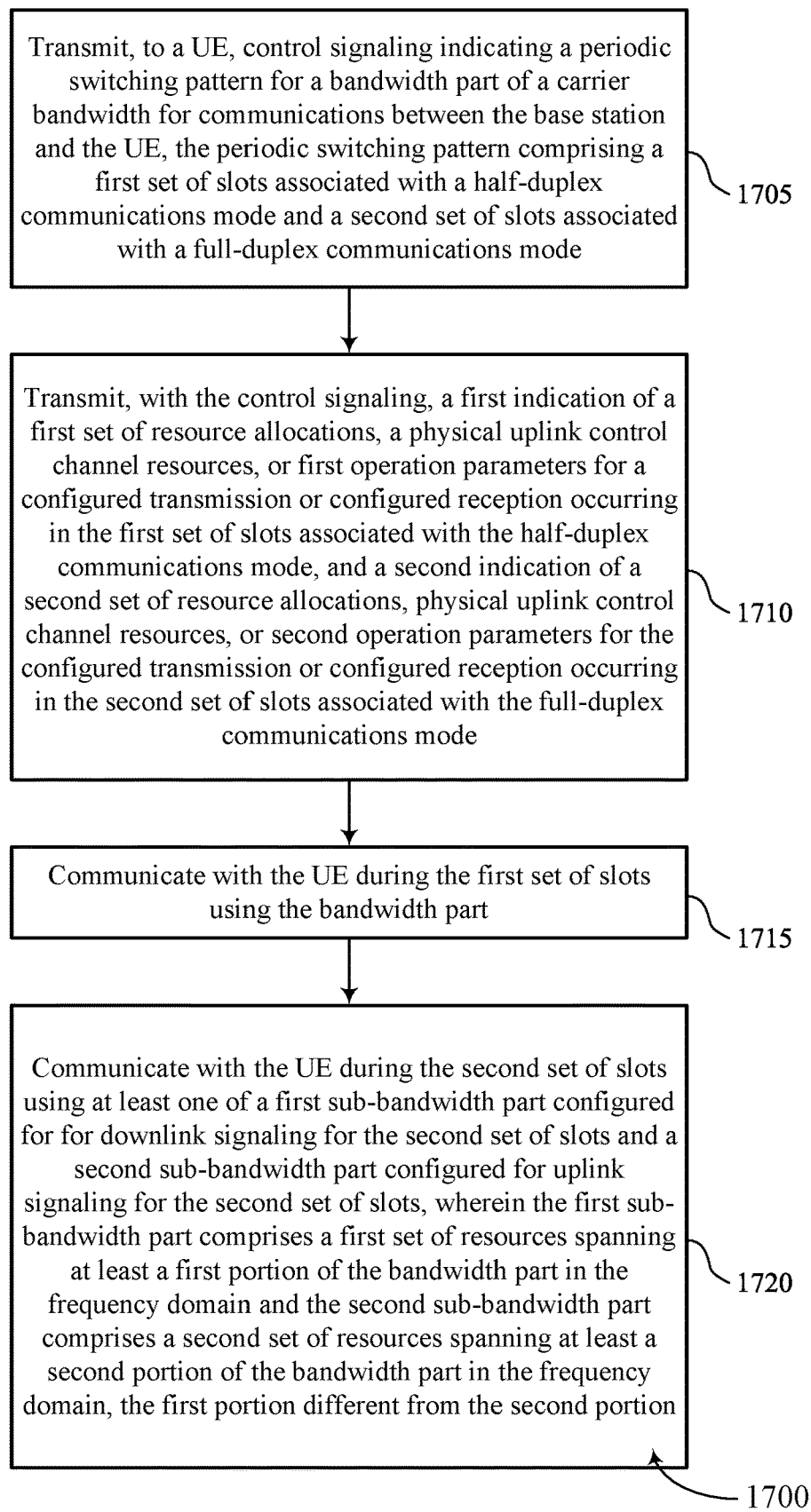

FIG. 17 shows a flowchart illustrating a method 1700 that supports configured BWP and resource allocation switching in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, control signaling indicating a periodic switching pattern for a BWP of a carrier bandwidth for communications between the base station and the UE, the periodic switching pattern including a first set of slots associated with a half-duplex communications mode and a second set of slots associated with a full-duplex communications mode. The operations of 1705 may be performed in accordance with examples as disclosed herein. In some examples, aspects of the operations of 1705 may be performed by a BWP switching manager 1225 as described with reference to FIG. 12. Additionally or alternatively, means for performing 1705 may, but not necessarily, include, for example, antenna 1325, transceiver 1315, communications manager 1320, memory 1330 (including code 1335), processor 1340 and/or bus 1350.

At 1710, the method may include transmitting, with the control signaling, a first indication of a first set of resource allocations, a PUCCH resources, or first operation parameters for a configured transmission or configured reception occurring in the first set of slots associated with the half-duplex communications mode, and a second indication of a second set of resource allocations, PUCCH resources, or second operation parameters for the configured transmission or configured reception occurring in the second set of slots associated with the full-duplex communications mode. The operations of 1710 may be performed in accordance with examples as disclosed herein. In some examples, aspects of the operations of 1710 may be performed by a Configured communications manager 1260 as described with reference to FIG. 12. Additionally or alternatively, means for performing 1710 may, but not necessarily, include, for example, antenna 1325, transceiver 1315, communications manager 1320, memory 1330 (including code 1335), processor 1340 and/or bus 1350.

At 1715, the method may include communicating with the UE during the first set of slots using the BWP. The operations of 1715 may be performed in accordance with examples as disclosed herein. In some examples, aspects of the operations of 1715 may be performed by an HD slot manager 1230 as described with reference to FIG. 12. Additionally or alternatively, means for performing 1715 may, but not necessarily, include, for example, antenna 1325, transceiver 1315, communications manager 1320, memory 1330 (including code 1335), processor 1340 and/or bus 1350.

At 1720, the method may include communicating with the UE during the second set of slots using at least one of a first sub-BWP configured for downlink signaling for the second set of slots and a second sub-BWP configured for uplink signaling for the second set of slots, where the first sub-BWP includes a first set of resources spanning at least a first portion of the BWP in the frequency domain and the second sub-BWP includes a second set of resources spanning at least a second portion of the BWP in the frequency domain, the first portion different from the second portion. The operations of 1720 may be performed in accordance with examples as disclosed herein. In some examples, aspects of the operations of 1720 may be performed by an FD slot manager 1235 as described with reference to FIG. 12. Additionally or alternatively, means for performing 1720 may, but not necessarily, include, for example, antenna 1325, transceiver 1315, communications manager 1320, memory 1330 (including code 1335), processor 1340 and/or bus 1350.

The following provides an overview of aspects of the present disclosure:

Aspect 1: A method for wireless communications at a UE, comprising: receiving, from a base station, control signaling indicating a periodic switching pattern for a BWP of a carrier bandwidth for communications between the base station and the UE, the periodic switching pattern comprising a first set of slots associated with a half-duplex communications mode and a second set of slots associated with a full-duplex communications mode; communicating with the base station during the first set of slots using the BWP; and communicating with the base station during the second set of slots using at least one of a first sub-BWP configured for downlink signaling for the second set of slots and a second sub-BWP configured for uplink signaling for the second set of slots, wherein the first sub-BWP comprises a first set of resources spanning at least a first portion of the BWP in the frequency domain and the second sub-BWP comprises a second set of resources spanning at least a second portion of the BWP in the frequency domain, the first portion different from the second portion.

Aspect 2: The method of aspect 1, further comprising receiving, with the control signaling, an indication of a first set of parameters associated with the half-duplex communications mode and a second set of parameters associated with the full-duplex communications mode.

Aspect 3: The method of aspect 2, wherein the first set of parameters and the second set of parameters comprise a beam identifier, a power control parameter, a transmission power, a rank index, a channel quality indicator, a modulation and coding scheme, or a combination thereof.

Aspect 4: The method of any of aspects 1 through 3, further comprising receiving, with the control signaling, an indication of the first set of resources and the second set of resources.

Aspect 5: The method of aspect 4, further comprising receiving, with the control signaling, a second indication of a guard band in the frequency domain between the first set of resources and the second set of resources.

Aspect 6: The method of any of aspects 1 through 5, further comprising receiving, with the control signaling, an indication of a guard period between the first set of slots associated with the half-duplex communications mode and the second set of slots associated with the full-duplex communications mode.

Aspect 7: The method of any of aspects 1 through 6, further comprising receiving, with the control signaling, an indication that at least one slot of the first set of slots associated with the half-duplex communications mode is reserved for control communications with the base station.

Aspect 8: The method of aspect 7, wherein the control communications comprises a synchronization signal block.

Aspect 9: The method of any of aspects 1 through 8, further comprising: receiving, with the control signaling, a first indication of a first set of resource allocations, PUCCH resources, or first operation parameters for a configured transmission or configured reception occurring in the first set of slots associated with the half-duplex communications mode, and a second indication of a second set of resource allocations, PUCCH resources, or second operation parameters for the configured transmission or configured reception occurring in the second set of slots associated with the full-duplex communications mode.

Aspect 10: The method of aspect 9, wherein the configured transmission or configured reception comprises a semi-persistent scheduling configuration occasion, a configured grant, a reference signal, a random access channel occasion, or a search space.

Aspect 11: The method of any of aspects 9 through 10, wherein the first operation parameters and the second operation parameters comprise a demodulation reference signal format, a modulation and coding scheme, a rank index, a precoding matrix indicator, or a combination thereof.

Aspect 12: The method of any of aspects 1 through 11, wherein receiving the control signaling comprises receiving the control signaling via a downlink control information message, a radio resource control message, or a MAC-CE message.

Aspect 13: The method of any of aspects 1 through 12, wherein communicating with the base station during the second set of slots comprises: communicating with the base station in the full-duplex communications mode using the first sub-BWP for receiving downlink signaling and the second sub-BWP for transmitting uplink signaling.

Aspect 14: A method for wireless communications at a base station, comprising: transmitting, to a UE, control signaling indicating a periodic switching pattern for a BWP of a carrier bandwidth for communications between the base station and the UE, the periodic switching pattern comprising a first set of slots associated with a half-duplex communications mode and a second set of slots associated with a full-duplex communications mode; communicating with the UE during the first set of slots using the BWP; and communicating with the UE during the second set of slots using at least one of a first sub-BWP configured for downlink signaling for the second set of slots and a second sub-BWP configured for uplink signaling for the second set of slots, wherein the first sub-BWP comprises a first set of resources spanning at least a first portion of the BWP in the frequency domain and the second sub-BWP comprises a second set of resources spanning at least a second portion of the BWP in the frequency domain, the first portion different from the second portion.

Aspect 15: The method of aspect 14, further comprising transmitting, to a second UE, second control signaling indicating the periodic switching pattern for the BWP for communications between the base station and the second UE.

Aspect 16: The method of any of aspects 14 through 15, further comprising: transmitting, to a second UE, second control signaling indicating a second periodic switching pattern for the BWP for communications between the base station and the second UE, the second periodic switching pattern comprising a third set of slots associated with the half-duplex communications mode and a fourth set of slots associated with the full-duplex communications mode, the third set of slots different from the first set of slots and the fourth set of slots different from the second set of slots; communicating with the second UE during the third set of slots using the BWP; and communicating with the second UE during the fourth set of slots using at least one of a third sub-BWP configured for downlink signaling for the fourth set of slots and a fourth sub-BWP configured for uplink signaling for the fourth set of slots, wherein the third sub-BWP comprises a third set of resources spanning at least a third portion of the BWP in the frequency domain and the fourth sub-BWP comprises a fourth set of resources spanning at least a fourth portion of the BWP in the frequency domain, the third portion different from the fourth portion.

Aspect 17: The method of any of aspects 14 through 16, further comprising: transmitting, to a second UE, second control signaling indicating a second periodic switching pattern for a second BWP of the carrier bandwidth for communications between the base station and the second UE, the second periodic switching pattern comprising a third set of slots associated with the half-duplex communications mode and a fourth set of slots associated with the full-duplex communications mode, the second BWP different from the BWP; communicating with the second UE during the third set of slots using the second BWP; and communicating with the second UE during the fourth set of slots using at least one of a third sub-BWP configured for downlink signaling for the fourth set of slots and a fourth sub-BWP configured for uplink signaling for the fourth set of slots, wherein the third sub-BWP comprises a third set of resources spanning at least a third portion of the second BWP in the frequency domain and the fourth sub-BWP comprises a fourth set of resources spanning at least a fourth portion of the second BWP in the frequency domain, the third portion different from the fourth portion.

Aspect 18: The method of any of aspects 14 through 17, further comprising transmitting, with the control signaling, an indication of a first set of parameters associated with the half-duplex communications mode and a second set of parameters associated with the full-duplex communications mode.

Aspect 19: The method of aspect 18, wherein the first set of parameters and the second set of parameters comprise a beam identifier, a power control parameter, a transmission power, a rank index, a channel quality indicator, a modulation and coding scheme, or a combination thereof.

Aspect 20: The method of any of aspects 14 through 19, further comprising transmitting, with the control signaling, an indication of the first set of resources and the second set of resources.

Aspect 21: The method of aspect 20, further comprising transmitting, with the control signaling, a second indication of a guard band in the frequency domain between the first set of resources and the second set of resources.

Aspect 22: The method of any of aspects 14 through 21, further comprising transmitting, with the control signaling, an indication of a guard period between the first set of slots associated with the half-duplex communications mode and the second set of slots associated with the full-duplex communications mode.

Aspect 23: The method of any of aspects 14 through 22, further comprising transmitting, with the control signaling, an indication that at least one slot of the first set of slots associated with the half-duplex communications mode is reserved for control communications with the base station.

Aspect 24: The method of aspect 23, wherein the control communications comprises a synchronization signal block.

Aspect 25: The method of any of aspects 14 through 24, further comprising: transmitting, with the control signaling, a first indication of a first set of resource allocations, a PUCCH resources, or first operation parameters for a configured transmission or configured reception occurring in the first set of slots associated with the half-duplex communications mode, and a second indication of a second set of resource allocations, PUCCH resources, or second operation parameters for the configured transmission or configured reception occurring in the second set of slots associated with the full-duplex communications mode.

Aspect 26: The method of aspect 25, wherein the configured transmission or configured reception comprises a semi-persistent scheduling configuration occasion, a configured grant, a reference signal, a random access channel occasion, or a search space.

Aspect 27: The method of any of aspects 25 through 26, wherein the first operation parameters and the second operation parameters comprise a demodulation reference signal format, a modulation and coding scheme, a rank index, a precoding matrix indicator, or a combination thereof.

Aspect 28: The method of any of aspects 14 through 27, wherein transmitting the control signaling comprises transmitting the control signaling via a downlink control information message, a radio resource control message, or a MAC-CE message.

Aspect 29: The method of any of aspects 14 through 28, wherein communicating with the UE during the second set of slots comprises: communicating with the UE in the full-duplex communications mode using the first sub-BWP for transmitting downlink signaling and the second sub-BWP for receiving uplink signaling.

Aspect 30: An apparatus comprising a memory, transceiver, and at least one processor coupled with the memory and the transceiver, the at least one processor configured to cause the apparatus to perform a method of any of aspects 1 through 13.

Aspect 31: An apparatus for wireless communications at a UE, comprising at least one means for performing a method of any of aspects 1 through 13.

Aspect 32: A non-transitory computer-readable medium storing code for wireless communications at a UE, the code comprising instructions executable by a processor to perform a method of any of aspects 1 through 13.

Aspect 33: An apparatus comprising a memory, transceiver, and at least one processor coupled with the memory and the transceiver, the at least one processor configured to cause the apparatus to perform a method of any of aspects 14 through 29.

Aspect 34: An apparatus for wireless communications at a base station, comprising at least one means for performing a method of any of aspects 14 through 29.

Aspect 35: A non-transitory computer-readable medium storing code for wireless communications at a base station, the code comprising instructions executable by a processor to perform a method of any of aspects 14 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network device, control signaling indicating a periodic switching pattern for a bandwidth part of a carrier bandwidth for communications between the network device and the UE, the periodic switching pattern comprising a first set of slots associated with a half-duplex communications mode and a second set of slots associated with a full-duplex communications mode;

communicating with the network device during the first set of slots using the bandwidth part; and communicating with the network device during the second set of slots using at least one of a first sub-bandwidth part configured for downlink signaling for the second set of slots and a second sub-bandwidth part configured for uplink signaling for the second set of slots, wherein the first sub-bandwidth part comprises a first set of resources spanning at least a first portion of the bandwidth part in the frequency domain and the second sub-bandwidth part comprises a second set of resources spanning at least a second portion of the bandwidth part in the frequency domain, the first portion different from the second portion, and wherein a guard period is between the first set of slots associated with the half-duplex communications mode and the second set of slots associated with the full-duplex communications mode.

2. The method of claim 1, further comprising:
receiving, with the control signaling, an indication of a first set of parameters associated with the half-duplex communications mode and a second set of parameters associated with the full-duplex communications mode, wherein the first set of parameters and the second set of parameters comprise a beam identifier, a power control parameter, a transmission power, a rank index, a channel quality indicator, a modulation and coding scheme, or a combination thereof.

3. The method of claim 1, further comprising:
receiving, with the control signaling, an indication of the first set of resources and the second set of resources.

4. The method of claim 3, further comprising:
receiving, with the control signaling, a second indication of a guard band in the frequency domain between the first set of resources and the second set of resources.

5. The method of claim 1, further comprising:
receiving, with the control signaling, an indication of the guard period.

6. The method of claim 1, further comprising:
receiving, with the control signaling, an indication that at least one slot of the first set of slots associated with the half-duplex communications mode is reserved for control communications with the network device.

7. The method of claim 6, wherein the control communications comprises a synchronization signal block.

8. The method of claim 1, further comprising:
receiving, with the control signaling, a first indication of a first set of resource allocations, first physical uplink control channel resources, or first operation parameters for a configured transmission or configured reception occurring in the first set of slots associated with the half-duplex communications mode, and a second indication of a second set of resource allocations, second physical uplink control channel resources, or second operation parameters for the configured transmission or configured reception occurring in the second set of slots associated with the full-duplex communications mode.

9. The method of claim 8, wherein the configured transmission or configured reception comprises a semi-persistent scheduling configuration occasion, a configured grant, a reference signal, a random access channel occasion, or a search space.

10. The method of claim 8, wherein the first operation parameters and the second operation parameters comprise a demodulation reference signal format, a modulation and coding scheme, a rank index, a precoding matrix indicator, or a combination thereof.

11. The method of claim 1, wherein receiving the control signaling comprises:
receiving the control signaling via a downlink control information message, a radio resource control message, or a medium access control control element message.

12. The method of claim 1, wherein communicating with the network device during the second set of slots comprises:
communicating with the network device in the full-duplex communications mode using the first sub-bandwidth part for receiving downlink signaling and the second sub-bandwidth part for transmitting uplink signaling.

13. A method for wireless communications at a network device, comprising:
transmitting, to a user equipment (UE), control signaling indicating a periodic switching pattern for a bandwidth part of a carrier bandwidth for communications between the network device and the UE, the periodic switching pattern comprising a first set of slots associated with a half-duplex communications mode and a second set of slots associated with a full-duplex communications mode;

communicating with the UE during the first set of slots using the bandwidth part; and communicating with the UE during the second set of slots using at least one of a first sub-bandwidth part configured for downlink signaling for the second set of slots and a second sub-bandwidth part configured for uplink signaling for the second set of slots, wherein the first sub-bandwidth part comprises a first set of resources spanning at least a first portion of the bandwidth part in the frequency domain and the second sub-bandwidth part comprises a second set of resources spanning at least a second portion of the bandwidth part in the frequency domain, the first portion different from the second portion, and wherein a guard period is between the first set of slots associated with the half-duplex communications mode and the second set of slots associated with the full-duplex communications mode.

14. The method of claim 13, further comprising:
transmitting, to a second UE, second control signaling indicating a second periodic switching pattern for the bandwidth part for communications between the network device and the second UE, the second periodic switching pattern comprising a third set of slots associated with the half-duplex communications mode and a fourth set of slots associated with the full-duplex communications mode, the third set of slots different from the first set of slots and the fourth set of slots different from the second set of slots;

communicating with the second UE during the third set of slots using the bandwidth part; and communicating with the second UE during the fourth set of slots using at least one of a third sub-bandwidth part configured for downlink signaling for the fourth set of slots and a fourth sub-bandwidth part configured for uplink signaling for the fourth set of slots, wherein the third sub-bandwidth part comprises a third set of resources spanning at least a third portion of the bandwidth part in the frequency domain and the fourth sub-bandwidth part comprises a fourth set of resources spanning at least a fourth portion of the bandwidth part in the frequency domain, the third portion different from the fourth portion.

15. The method of claim 13, further comprising:
transmitting, to a second UE, second control signaling indicating a second periodic switching pattern for a second bandwidth part of the carrier bandwidth for communications between the network device and the second UE, the second periodic switching pattern comprising a third set of slots associated with the half-duplex communications mode and a fourth set of slots associated with the full-duplex communications mode, the second bandwidth part different from the bandwidth part;
communicating with the second UE during the third set of slots using the second bandwidth part; and
communicating with the second UE during the fourth set of slots using at least one of a third sub-bandwidth part configured for downlink signaling for the fourth set of slots and a fourth sub-bandwidth part configured for uplink signaling for the fourth set of slots, wherein the third sub-bandwidth part comprises a third set of resources spanning at least a third portion of the second bandwidth part in the frequency domain and the fourth sub-bandwidth part comprises a fourth set of resources spanning at least a fourth portion of the second bandwidth part in the frequency domain, the third portion different from the fourth portion.

16. The method of claim 13, further comprising:
transmitting, with the control signaling, an indication of a first set of parameters associated with the half-duplex communications mode and a second set of parameters associated with the full-duplex communications mode.

17. The method of claim 16, wherein the first set of parameters and the second set of parameters comprise a beam identifier, a power control parameter, a transmission power, a rank index, a channel quality indicator, a modulation and coding scheme, or a combination thereof.

18. The method of claim 13, further comprising:
transmitting, with the control signaling, an indication of the first set of resources and the second set of resources.

19. The method of claim 18, further comprising:
transmitting, with the control signaling, a second indication of a guard band in the frequency domain between the first set of resources and the second set of resources.

20. The method of claim 13, further comprising:
transmitting, with the control signaling, an indication of the guard period.

21. The method of claim 13, further comprising:
transmitting, with the control signaling, an indication that at least one slot of the first set of slots associated with the half-duplex communications mode is reserved for control communications with the network device.

22. The method of claim 21, wherein the control communications comprises a synchronization signal block.

23. The method of claim 13, further comprising:
transmitting, with the control signaling, a first indication of a first set of resource allocations, first physical uplink control channel resources, or first operation parameters for a configured transmission or configured reception occurring in the first set of slots associated with the half-duplex communications mode, and a second indication of a second set of resource allocations, second physical uplink control channel resources, or second operation parameters for the configured transmission or configured reception occurring in the second set of slots associated with the full-duplex communications mode.

24. The method of claim 23, wherein the configured transmission or configured reception comprises a semi-persistent scheduling configuration occasion, a configured grant, a reference signal, a random access channel occasion, or a search space.

25. The method of claim 13, wherein transmitting the control signaling comprises:
transmitting the control signaling via a downlink control information message, a radio resource control message, or a medium access control control element message.

26. The method of claim 13, wherein communicating with the UE during the second set of slots comprises:
communicating with the UE in the full-duplex communications mode using the first sub-bandwidth part for transmitting downlink signaling and the second sub-bandwidth part for receiving uplink signaling.

27. An apparatus for wireless communications, comprising:
memory;
a transceiver; and
at least one processor of a user equipment (UE), the at least one processor coupled with the memory and the transceiver, and configured to:
receive, via the transceiver, from a network device, control signaling indicating a periodic switching pattern for a bandwidth part of a carrier bandwidth for communications between the network device and the UE, the periodic switching pattern comprising a first set of slots associated with a half-duplex communications mode and a second set of slots associated with a full-duplex communications mode;
communicate, via the transceiver, with the network device during the first set of slots using the bandwidth part; and
communicate, via the transceiver, with the network device during the second set of slots using at least one of a first sub-bandwidth part configured for downlink signaling for the second set of slots and a second sub-bandwidth part configured for uplink signaling for the second set of slots, wherein the first sub-bandwidth part comprises a first set of resources spanning at least a first portion of the bandwidth part in the frequency domain and the second sub-bandwidth part comprises a second set of resources spanning at least a second portion of the bandwidth part in the frequency domain, the first portion different from the second portion, and wherein a guard period is between the first set of slots associated with the half-duplex communications mode and the second set of slots associated with the full-duplex communications mode.

28. The apparatus of claim 27, the at least one processor further configured to cause the apparatus to:
receive, with the control signaling, an indication of a first set of parameters associated with the half-duplex communications mode and a second set of parameters associated with the full-duplex communications mode, wherein the first set of parameters and the second set of parameters comprise a beam identifier, a power control parameter, a transmission power, a rank index, a channel quality indicator, a modulation and coding scheme, or a combination thereof.

29. The apparatus of claim 27, the at least one processor further configured to cause the apparatus to:
receive, with the control signaling, a second indication of a guard band in the frequency domain between the first set of resources and the second set of resources.

30. An apparatus for wireless communications, comprising:
- memory; and
- at least one processor of a network device, the at least one processor coupled with the memory, and configured to:
  - transmit, to a user equipment (UE), control signaling indicating a periodic switching pattern for a bandwidth part of a carrier bandwidth for communications between the network device and the UE, the periodic switching pattern comprising a first set of slots associated with a half-duplex communications mode and a second set of slots associated with a full-duplex communications mode;
  - communicate, with the UE during the first set of slots using the bandwidth part; and
  - communicate, with the UE during the second set of slots using at least one of a first sub-bandwidth part configured for downlink signaling for the second set of slots and a second sub-bandwidth part configured for uplink signaling for the second set of slots, wherein the first sub-bandwidth part comprises a first set of resources spanning at least a first portion of the bandwidth part in the frequency domain and the second sub-bandwidth part comprises a second set of resources spanning at least a second portion of the bandwidth part in the frequency domain, the first portion different from the second portion, and wherein a guard period is between the first set of slots associated with the half-duplex communications mode and the second set of slots associated with the full-duplex communications mode.

* * * * *